(12) United States Patent
Nibler et al.

(10) Patent No.: US 8,137,545 B2
(45) Date of Patent: Mar. 20, 2012

(54) POOL FILTER

(75) Inventors: David B. Nibler, Sonoma, CA (US); Randy Tan, Camarillo, CA (US); Steve E. Gutai, Petaluma, CA (US)

(73) Assignee: Zodiac Pool Systems, Inc., Vista, CA (US)

( * ) Notice: Subject to any disclaimer, the term of this patent is extended or adjusted under 35 U.S.C. 154(b) by 0 days.

(21) Appl. No.: 12/880,601

(22) Filed: Sep. 13, 2010

(65) Prior Publication Data

US 2011/0062068 A1    Mar. 17, 2011

Related U.S. Application Data

(63) Continuation of application No. 12/053,446, filed on Mar. 21, 2008, now Pat. No. 7,794,591, which is a continuation-in-part of application No. 11/967,664, filed on Dec. 31, 2007, now Pat. No. 7,815,796.

(60) Provisional application No. 60/896,797, filed on Mar. 23, 2007.

(51) Int. Cl.
*B01D 29/66* (2006.01)

(52) U.S. Cl. .............................. 210/167.12; 210/167.14

(58) Field of Classification Search ............... 210/167.1, 210/167.12, 167.13, 167.14, 416.1, 416.2
See application file for complete search history.

(56) References Cited

U.S. PATENT DOCUMENTS

| | | |
|---|---|---|
| 179,698 A | 7/1876 | Hagar |
| 432,248 A | 7/1890 | Rinman |
| 732,270 A | 6/1903 | Bowman |
| 777,840 A | 12/1904 | Chaplin |
| 797,152 A | 8/1905 | Sheckler |
| 1,394,631 A | 10/1921 | Luschka et al. |
| 1,528,449 A | 3/1925 | Meyer |
| 1,748,898 A | 2/1930 | Peebles |
| 1,820,020 A | 8/1931 | Hewitt |
| 2,284,787 A | 6/1942 | Winkler |
| 2,315,681 A | 4/1943 | Weisgerber |

(Continued)

FOREIGN PATENT DOCUMENTS

GB    1372014    10/1974

OTHER PUBLICATIONS

Jandy 2007 Catalog, Filters, Jandy Pool Products, Inc., pp. 23-30.

(Continued)

*Primary Examiner* — Fred Prince
(74) *Attorney, Agent, or Firm* — Dorsey & Whitney LLP

(57) ABSTRACT

A pool filter for use in pool piping or other fluid conveyance system. The pool filter may include a housing defining a fluid chamber for receiving one or more filters. Multiple openings may be defined in the housing for receiving and removing fluid from the fluid chamber. The openings may be approximately the same size and may be located on the housing at similar elevations and/or radial sectors. One or more footings may be joined to the housing. Each footing may include a base portion for receiving anchor members to anchor the housing to a support surface. The footings may be designed to transfer to the support surface predetermined lateral or other forces imposed upon the pool filter by events such as earthquakes and hurricanes. The footings may be separate components joined to the housing by tabs and/or mechanical fasteners.

29 Claims, 16 Drawing Sheets

U.S. PATENT DOCUMENTS

| | | | |
|---|---|---|---|
| 2,335,109 A | 11/1943 | Conery | |
| 2,615,397 A | 10/1952 | Conery | |
| 2,662,988 A | 12/1953 | McKim | |
| 2,760,262 A | 8/1956 | Homan | |
| 2,882,828 A | 4/1959 | Hinckley | |
| 3,091,339 A | 5/1963 | Marra | |
| 3,178,024 A | 4/1965 | Jacuzzi | |
| 3,420,376 A | 1/1969 | Smith | |
| 3,429,443 A | 2/1969 | Stern | |
| 3,493,116 A | 2/1970 | Edmiston | |
| 3,519,135 A | 7/1970 | Lerner | |
| 3,581,895 A | 6/1971 | Howard et al. | |
| 3,625,365 A | 12/1971 | Armstrong et al. | |
| 3,664,768 A | 5/1972 | Mays et al. | |
| 3,707,233 A | 12/1972 | Lerner | |
| D227,565 S | 7/1973 | Ehret | |
| 3,747,768 A | 7/1973 | Barrera | |
| 3,767,050 A | 10/1973 | Reiner | |
| 3,774,772 A | 11/1973 | Yeths | |
| 3,779,387 A | 12/1973 | Day et al. | |
| 3,795,320 A | 3/1974 | Ehret | |
| 3,828,932 A | 8/1974 | Schneer | |
| 3,834,537 A | 9/1974 | Brett | |
| D235,143 S | 5/1975 | Ehret | |
| 3,911,068 A | 10/1975 | Hamilton | |
| 3,929,151 A | 12/1975 | Rubin | |
| 3,957,644 A | 5/1976 | Edmonson | |
| 3,988,244 A | 10/1976 | Brooks | |
| 4,003,835 A | 1/1977 | Johnson | |
| 4,043,917 A | 8/1977 | Rowley et al. | |
| 4,105,555 A | 8/1978 | Pease | |
| 4,127,485 A | 11/1978 | Baker et al. | |
| 4,134,836 A | 1/1979 | Rowley et al. | |
| 4,169,793 A | 10/1979 | Lockshaw | |
| 4,187,179 A * | 2/1980 | Harms | 210/238 |
| 4,250,540 A | 2/1981 | Kristofek | |
| 4,283,281 A | 8/1981 | Cogan | |
| 4,390,425 A | 6/1983 | Tafara et al. | |
| 4,537,681 A | 8/1985 | Argiropoulos et al. | |
| 4,602,463 A | 7/1986 | Holowaty | |
| 4,627,118 A | 12/1986 | Baker | |
| 4,657,673 A | 4/1987 | Kessler | |
| 4,704,202 A | 11/1987 | Poyner | |
| 4,712,812 A | 12/1987 | Weir, III | |
| 4,769,052 A | 9/1988 | Kowalski | |
| 4,798,670 A | 1/1989 | Treene | |
| 4,810,170 A | 3/1989 | Ide | |
| 4,822,077 A | 4/1989 | Hendrickson | |
| 4,861,466 A | 8/1989 | Leoncavallo et al. | |
| 4,869,817 A | 9/1989 | Mendoza et al. | |
| 4,894,149 A | 1/1990 | Block | |
| 4,923,601 A | 5/1990 | Drori | |
| 4,924,069 A | 5/1990 | Giordani | |
| 4,931,183 A | 6/1990 | Klein et al. | |
| 4,964,609 A | 10/1990 | Tomell | |
| 4,997,558 A | 3/1991 | Baker | |
| 5,000,488 A | 3/1991 | Albrecht | |
| D316,741 S | 5/1991 | Kurth et al. | |
| 5,068,033 A | 11/1991 | Tobias et al. | |
| 5,087,357 A | 2/1992 | Villa | |
| 5,109,575 A | 5/1992 | Angarola et al. | |
| 5,112,481 A | 5/1992 | Drori | |
| 5,188,727 A | 2/1993 | Kurth et al. | |
| 5,190,651 A | 3/1993 | Spencer et al. | |
| 5,222,525 A | 6/1993 | Munroe | |
| 5,240,593 A | 8/1993 | Moredock | |
| D342,986 S | 1/1994 | Kurth | |
| 5,306,121 A | 4/1994 | Heflin et al. | |
| 5,320,752 A | 6/1994 | Clack et al. | |
| 5,328,604 A | 7/1994 | Drori | |
| 5,375,887 A | 12/1994 | Johnson | |
| 5,409,606 A | 4/1995 | Spencer | |
| 5,505,847 A | 4/1996 | Yamada et al. | |
| 5,524,860 A | 6/1996 | Ives | |
| 5,584,998 A | 12/1996 | Teter et al. | |
| 5,587,074 A | 12/1996 | Lynch et al. | |
| 5,653,831 A | 8/1997 | Spencer | |
| 5,656,159 A | 8/1997 | Spencer et al. | |
| 5,687,994 A | 11/1997 | Hansen | |
| 5,753,071 A | 5/1998 | Spencer | |
| 5,762,785 A | 6/1998 | Ruiz | |
| 5,882,515 A | 3/1999 | Lacy et al. | |
| 5,942,109 A | 8/1999 | Wuebker et al. | |
| 5,989,419 A | 11/1999 | Dudley et al. | |
| 6,029,942 A | 2/2000 | Daddis, Jr. et al. | |
| 6,036,853 A | 3/2000 | Spencer | |
| 6,156,213 A * | 12/2000 | Dudley et al. | 210/791 |
| 6,258,266 B1 | 7/2001 | Riback et al. | |
| 6,280,619 B1 | 8/2001 | Lacy et al. | |
| 6,287,466 B1 | 9/2001 | Yassin | |
| 6,345,558 B1 | 2/2002 | Wilson | |
| 6,450,782 B1 | 9/2002 | Sakamoto | |
| 6,554,939 B1 | 4/2003 | Murphy | |
| 6,582,613 B2 | 6/2003 | Mooneyham | |
| 6,605,211 B1 | 8/2003 | Slopack | |
| 6,797,164 B2 * | 9/2004 | Leaverton | 210/167.12 |
| 6,874,641 B2 | 4/2005 | Clary | |
| 7,022,230 B2 | 4/2006 | Imai et al. | |
| 7,081,200 B2 | 7/2006 | Planas Valls | |
| 7,093,721 B2 | 8/2006 | Imanse et al. | |
| 7,097,766 B2 | 8/2006 | Moya | |
| 7,207,604 B2 | 4/2007 | Wilson | |
| 7,294,262 B2 | 11/2007 | Tadlock | |
| 7,794,591 B2 | 9/2010 | Nibler et al. | |
| 7,815,796 B2 | 10/2010 | Nibler et al. | |
| 2004/0057845 A1 | 3/2004 | Skinner | |
| 2005/0002800 A1 | 1/2005 | Kimura et al. | |
| 2005/0158185 A1 | 7/2005 | Herrick et al. | |
| 2006/0124527 A1 | 6/2006 | Goodwin et al. | |
| 2007/0045163 A1 * | 3/2007 | Meincke et al. | 210/167.1 |
| 2007/0056903 A1 | 3/2007 | James | |
| 2007/0163929 A1 | 7/2007 | Stiles, Jr. et al. | |
| 2007/0227959 A1 | 10/2007 | Sinur et al. | |
| 2008/0230454 A1 | 9/2008 | Nibler et al. | |
| 2008/0230455 A1 | 9/2008 | Nibler et al. | |
| 2011/0089094 A1 | 4/2011 | Nibler et al. | |
| 2011/0226682 A1 | 9/2011 | Nibler et al. | |

OTHER PUBLICATIONS

Jandy 2007 Catalog, Filter Parts, Jandy Pool Products, Inc., pp. 31-41.
Jandy 2008 Catalog, Filters, Jandy Pool Products, Inc., pp. 23-31.
Jandy 2008 Catalog, Filter Parts, Jandy Pool Products, Inc., pp. 32-44.
Office Action dated Nov. 18, 2009, Australia Patent Application No. 2008201362, 3 pages.
Office Action dated Jul. 30, 2010, Canada Patent Application No. 2,627,178, 3 pages.
Jandy 2009 Catalog, Filters, Jandy Pool Products, Inc., 33 pages.

* cited by examiner (A) TO FIG. 5B

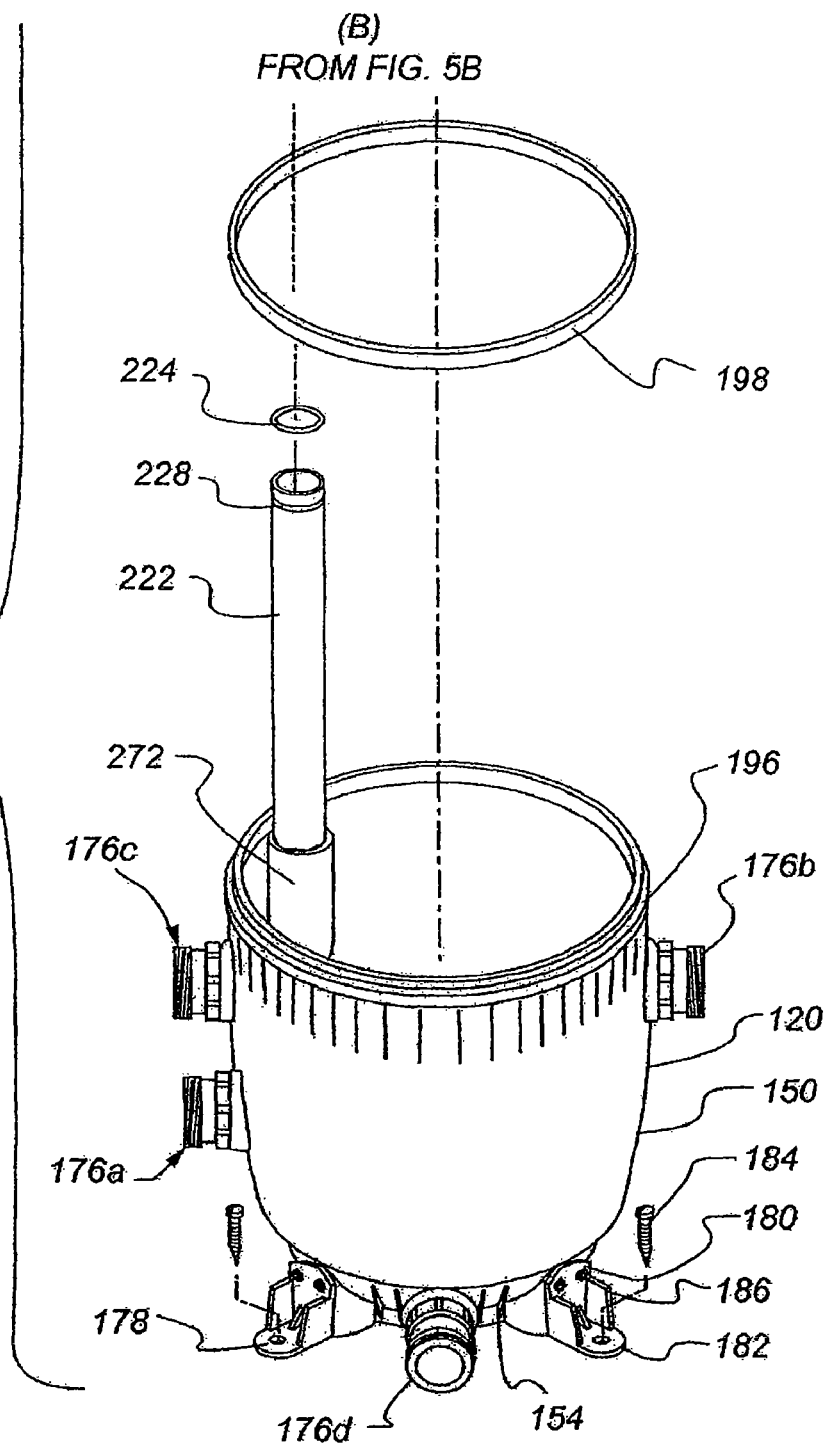

POOL FILTER

CROSS-REFERENCE TO RELATED APPLICATION

This application is a continuation of U.S. patent application Ser. No. 12/053,446, filed Mar. 21, 2008, entitled "Pool Filter," now U.S. Pat. No. 7,794,591 which is a continuation-in-part of U.S. patent application Ser. No. 11/967,664, filed Dec. 31, 2007, entitled "Pool Filter," now U.S. Pat. No. 7,815,796 which claims the benefit under 35 U.S.C. §119(e) of U.S. Provisional Application No. 60/896,797, filed Mar. 23, 2007, entitled "Pool Filter," and all of which are hereby incorporated herein by reference in their entireties.

FIELD OF INVENTION

The present invention generally relates to filters, and more specifically to pool filters.

BACKGROUND

Pool filters are used in pool or spa fluid circulation systems to filter water used in a pool or spa. Pool filters often include a single inlet for receiving water, a single outlet for delivering filtered water from the pool filter, and a drain outlet for draining water from the pool filter. The single inlet and outlet arrangement limits the flexibility available to a pool designer when designing the piping system for a pool or spa. This limited flexibility may be an issue when the pool filter is located in a confined or limited space, or when placing the pool filter in an already plumbed pool piping system.

Yet another issue with pool filters is the drain outlet is often smaller than both the fluid inlet and the filtered fluid outlet. This size difference requires different sized fittings for the drain outlet and the fluid inlet and outlet, which increases manufacturing costs and requires different sized tools for assembling the pool filter. Still yet another issue is pool filters typically are set directly on pads or other support surfaces without anchoring the pool filter to the support surface. In areas subject to earthquakes or hurricanes, the pool filter may undesirably tip over during such an event, resulting in potential disconnection of the pool filter from the pool piping system. Such disconnection may permit chemicals or other potentially hazardous materials used in the pool circulation system to enter the surrounding environment.

SUMMARY OF THE INVENTION

One embodiment of the present invention may take the form of a pool filter comprising a housing. The housing may define a chamber for receiving a filter. The housing may include at least four openings in fluid communication with the chamber. Each of the at least four openings may be approximately a similar size. At least one first opening of the four openings may function as a fluid inlet. At least one second opening of the four openings may function as a fluid outlet. At least one third opening of the four openings may function as a drain.

Another embodiment may take the form of a pool filter including a housing and at least one footing. The housing may define a chamber for receiving a filter, a fluid inlet in fluid communication with the chamber, and a fluid outlet in fluid communication with the chamber. The at least one footing may be joined to the housing and may be adapted to receive an anchoring member to anchor the housing to a support surface.

Still another embodiment may take the form of a pool filter including a housing. The housing may define a chamber for receiving a filter. The housing may include at least three bosses. At least three of the three bosses may be sufficiently sized for forming either a fluid inlet or a fluid outlet therein.

BRIEF DESCRIPTION OF THE DRAWINGS

FIG. 5C is a partially exploded perspective view of a lower portion of the pool filter of FIG. 1.

DETAILED DESCRIPTION

Figure 1:
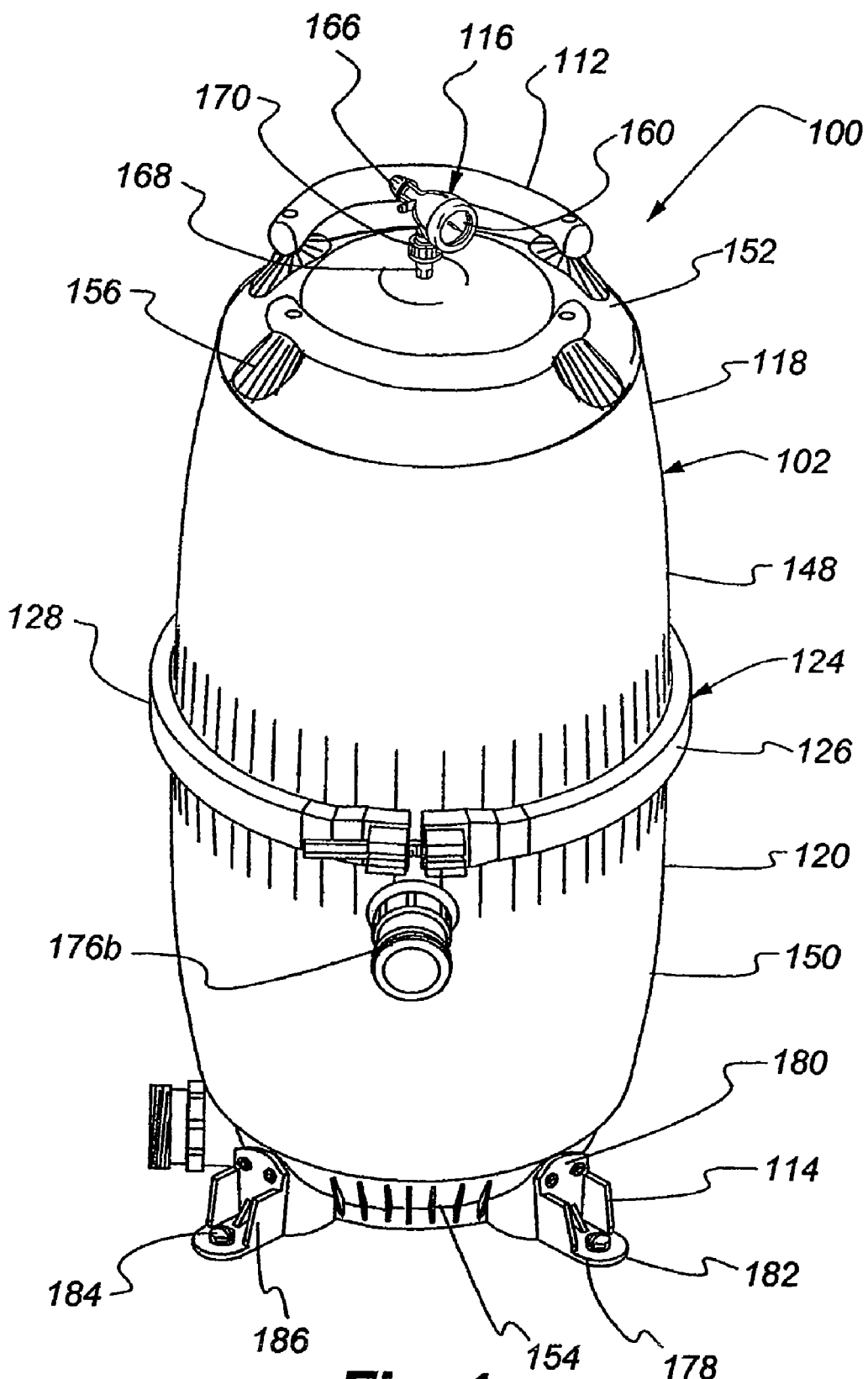
FIG. 1 is a perspective view of an embodiment of a pool filter.
Figure 2:
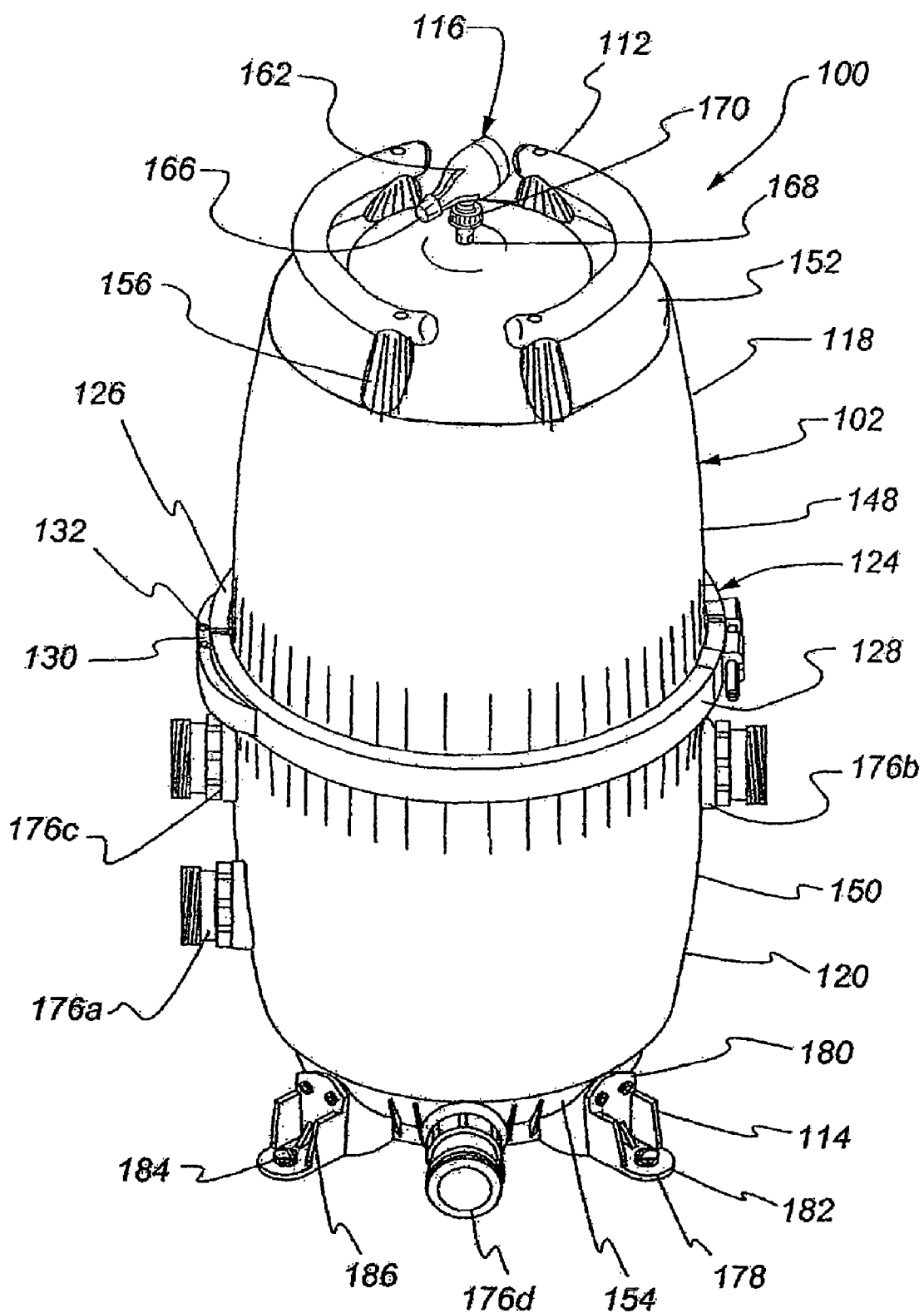
FIG. 2 is another perspective view of the pool filter of FIG. 1.

Described herein are various embodiments of a pool filter for use in a fluid conveyance system, such as a pool piping system. The pool filter may take the form of a housing defining a fluid chamber configured to receive one or more filters, such as filter cartridges. Multiple openings may be defined by the housing for receiving fluid into the fluid chamber, delivering filtered fluid from the fluid chamber, and draining fluid from the fluid chamber. The openings may be approximately the same size. At least some of the openings may be located on similar radial sectors or sides of the housing and/or at similar elevations on the housing. One type of fitting for joining pipes, tubes, or hoses to the pool filter may be used with each opening. At least one opening may be positioned at a lower end portion of the housing. Such a lower positioned opening may function as a drain, thus allowing gravity to assist in draining fluid from the fluid chamber for cleaning, maintaining, or replacing pool filter components.

One or more footings may be joined to the housing. Each footing may include a base portion for receiving anchor members, such as anchor bolts, to anchor the housing to a support surface. The footings may be designed to transfer and resist predetermined lateral or other forces that may be imposed upon the pool filter by events such as earthquakes and hurricanes. The footings may be separate components joined to the housing by tabs and/or mechanical fasteners to increase the ease and/or reduce the cost of manufacturing the housing for the pool filter, while providing a sufficient structural system for resisting potential earthquake or hurricane forces.

FIGS. 1-4 depict an embodiment of a pool filter 100 for use in fluid conveyance system, such as a pool piping system. With reference to FIGS. 1-4, the pool filter 100 may include a housing 102 with one or more openings that function as inlets for receiving a fluid (such as water) to filter through the pool filter 100 and one or more openings that function as outlets and/or drains for delivering filtered fluid and/or draining fluid from the pool filter 100. One or more handles 112 to grasp for lifting or moving the pool filter 100 may be joined to the housing 102. One or more footings 114 for supporting and/or anchoring the pool filter 100 on or to a surface may be joined the housing 102, and a pressure gauge assembly 116 for monitoring pressure within the pool filter 100 may be mounted on the housing 102. The housing 102, handles 112, and footings 114 may be formed from plastics, such as polyvinyl chloride (PVC), metals, any other suitable material, or any combination thereof.

The housing 102 may include an upper housing portion 118 or lid removably joined to a lower housing 120 portion for providing access to a fluid chamber 122 (see FIG. 6) defined by the housing. The upper housing portion 118 may be joined to the lower housing portion 120 by a connector, such as a clamp ring assembly 124. With reference to FIGS. 1-4 and 5A, the clamp ring assembly 124 may take the form of a clamp ring composed of first and second clamp ring bands 126, 128, each having first and second ends. The first and second clamp ring bands 126, 128 may be hingedly joined to each other at their first ends by a clamp link 130. The clamp link 130 may be joined to each clamp ring band with clamp link fasteners 132, such as bolts 134 and nuts 136 as shown in the figures or any other suitable fastener.

At their second ends, the clamp ring bands 126, 128 may be joined by a fastening system, which may take the form of a threaded rod 138 and first and second nuts 140, 142. The first nut 140 may be a "T" nut threadedly joined to the threaded rod 138 at one end. The first nut 140 may be received within a fastener slot formed in a fastener housing 144 formed on the first clamp ring band 126. The fastener slot may be sized to limit movement of the first nut 140 towards the second clamp ring band 128. The second nut 142 may be a coupling nut threadedly joined to the other end of the threaded rod 138. The second nut 142 may include a shoulder for engaging a second fastener housing 146 formed on the second clamp ring band 128. As the second nut 142 is tightened on the threaded rod 138 when received in each fastener housing 144, 146, the first and second clamp ring bands 126, 128 are drawn together around the upper and lower housing portions 118, 120, thus securing the upper housing portion 118 to the lower housing portion 120.

Referring to FIGS. 1-4, the upper and lower housing portions 118, 120 may each include a sidewall portion 148, 150 defining an opening at one end. At their other ends, each sidewall portion 148, 150 may be joined to an end wall portion 152, 154. Each sidewall portion 148, 150 may be generally cylindrical, such as shown, for example, in FIGS. 1-4, or any other desired shape. Each end wall portion 152, 154 may be generally semi- or partially spherical, such as shown, for example, in FIGS. 1-4, or any other desired shape.

With reference to FIGS. 1-4 and 5A, the upper housing portion 118 may further include one or more upper portion posts 156 extending upwardly from the upper housing portion's end wall portion 152. The upper portion posts 156 may support one or more handles 112 or other gripping elements for grasping by the user. The upper portion posts 156 may provide separation between the handle 112 and the upper housing portion 118, thus permitting a user to place at least a portion of the user's hand between the handle 112 and the upper housing portion 118. The handles 112 may be removably joined to the upper portion posts 156 by mechanical fasteners, such as screws or the like, or by any other method for removably joining two or more components. In some embodiments, the handles 112 may be fixedly joined to the upper portion posts 156 by heat or sonic welding, by integrally forming the handles 112 with the posts 156 by methods such as injection molding or the like, or by any other desired method for fixedly joining two or more components. Each handle 112 may be generally arcuate shaped, such as shown, for example, in FIG. 1-4, or any other desired shape.

A pressure gauge assembly 116 may be joined to or mounted on the upper housing portion 118. The pressure gauge assembly 116 may include a pressure gauge 160 received within a pressure gauge housing 162. The pressure gauge 160 may monitor pressure within the pool filter 100 for assessing when one or more filters 164 contained within the fluid chamber 122 (see FIG. 6) may require cleaning or replacement and/or when to remove accumulated debris from the fluid chamber 122. Generally, as a filter 164 becomes clogged or dirty, the pressure within the fluid chamber 122 increases. If too much pressure builds up within the fluid chamber 122, the upper housing portion 118 may be blown off or otherwise separated from the lower housing portion 120. Such separation may result in property damage or injury in the vicinity of the pool filter 100. Thus, periodic cleaning or replacement of the filters 164 and the fluid chamber 122 may be required to prevent such undesirable pressures from occurring within the pool filter 100.

The pressure gauge assembly 116 may further include an air release assembly 166. The air release assembly 166 may include a valve to selectively open and close the air release assembly 166. The valve may be used to release air contained within the pool filter 100 through the air release assembly 166. Once mostly water exits the pool filter 100 through the air release assembly 166, the valve may be closed to prevent water from leaking from the pool filter 100. When stopping the system to clean or repair the pool filter 100, the air assembly valve may be opened to release pressure built up within the pool filter 100 during operation.

The pressure gauge assembly 116 may include a tank adapter 168 to provide fluid communication between the pressure gauge housing 162 and the fluid chamber 122. The tank adapter 168 may include a threaded portion for threadedly joining the tank adapter 168 to the upper housing portion 118 using a threaded hole defined in the upper housing portion 118. Prior to joining the tank adapter 168 to the upper housing portion 118, the tank adapter 168 may be received within a pressure gauge coupler 170. The pressure gauge coupler 170 may include a radially inward extending flange or lip for engagement with an upper portion of the tank adapter 168 to maintain a connection between the pressure gauge coupler 170 and the tank adapter 168. The pressure gauge coupler 170 may further be internally threaded for threadedly joining the pressure gauge coupler 170 to the pressure gauge housing 162 in order to operably associate the pressure gauge housing 162 with the tank adapter 168. Although threaded connections are described as joining the tank adapter 168 to the housing 102 and the pressure gauge coupler 170 to the pressure gauge housing 162, any other connection method, such as press fitting, welding, and so on, or combination thereof may be used.

The pressure gauge assembly 116 may include lower and upper pressure gauge O-rings 172, 174 or other suitable fluid sealing elements. The lower pressure gauge O-ring 172 may be received on the threaded portion of the tank adapter 168 to provide a fluid seal between the upper housing portion 118 and the tank adapter 168. The upper pressure gauge O-ring 174 may be received within a groove formed on a downward facing surface of the threaded portion of the pressure gauge housing 162 to provide a fluid seal between the pressure gauge housing 162 and the tank adapter 168.

With reference to FIGS. 1-4 and 6, the lower housing portion 120 may include one or more openings providing fluid access to the fluid chamber 122 defined by the upper and lower housing portions 118, 120. If desired, openings may be formed within the upper housing portion 118. As described in more detail below, fittings 176a-d may be connected to the housing 102 proximate the openings for joining pool system piping, or other fluid piping, to the pool filter. Each opening may be similarly sized such that a universal, substantially same sized fitting may be used with each opening.

Two or more openings may be defined on the same radial portion, sector or side of the housing 102. Such same side positioning permits inlet and outlet pipes to be connected to the same side of the pool filter 100, if desired. At least one opening may be located at approximately the same elevation as an opening on another radial portion, sector or side of the pool filter 100. Such elevation positioning permits openings on any radial portion or side to be used for a specific function, for example, as a fluid outlet, without changing the vertical or other lengths of piping components attached to the opening. At least one opening may be located proximate a bottom portion or lower end of the pool filter 100. Such a lower positioned opening may be used to drain fluid from the pool filter 100.

With reference to FIGS. 1-4, two openings are shown as positioned on the same radial side of the housing 100. The upper same side opening may be used as a fluid outlet and the lower same side opening as a fluid inlet. Although each opening is described as an inlet or an outlet, either of these two openings may be used as an inlet or an outlet. Further, more or less openings may be positioned on this radial portion and may be used as inlets or outlets, if desired.

With further reference to FIGS. 1-4, a third opening may be positioned on a different radial section than the first two openings. The third opening may also be positioned at approximately the same elevation as the upper same side opening and may be used as a fluid inlet. This third opening, however, could be used as a fluid outlet if desired. Further, if desired, more or less openings may be positioned in this radial section. Also, any opening positioned at a different radial location may be placed at an elevation approximately the same as the lower same side opening or at any other desired elevation. Yet further, although the opening is depicted as positioned on a radial section approximately diametrically opposite the same side openings, the opening, or openings, may be positioned on any other radial section.

With continued reference to FIGS. 1-4, a fourth opening may be positioned at a lower end of the housing 102 on a radial section different than the other three openings. The opening may be used as a drain. Positioning this opening proximate the bottom of the pool filter 100 allows gravity to assist in draining fluid from the pool filter 100. If desired, however, the fourth opening may be used as a fluid inlet, or as an outlet for supplying filtered fluid to the fluid system. Further, the fourth opening may be positioned within the same radial sector or side as any of the other openings and/or additional openings may be positioned within the fourth opening's radial sector or side.

Each of the four openings depicted in FIGS. 1-4 may be approximately the same size. A single sized fitting may be used with each of the same sized openings, thus providing flexibility when joining other piping components to the pool filter 100. Yet further, any of the fittings 176a-d may be connected to a cap (not shown) or other cover to close an opening when not using the opening in a pool or other fluid circulation system.

Figure 5A:
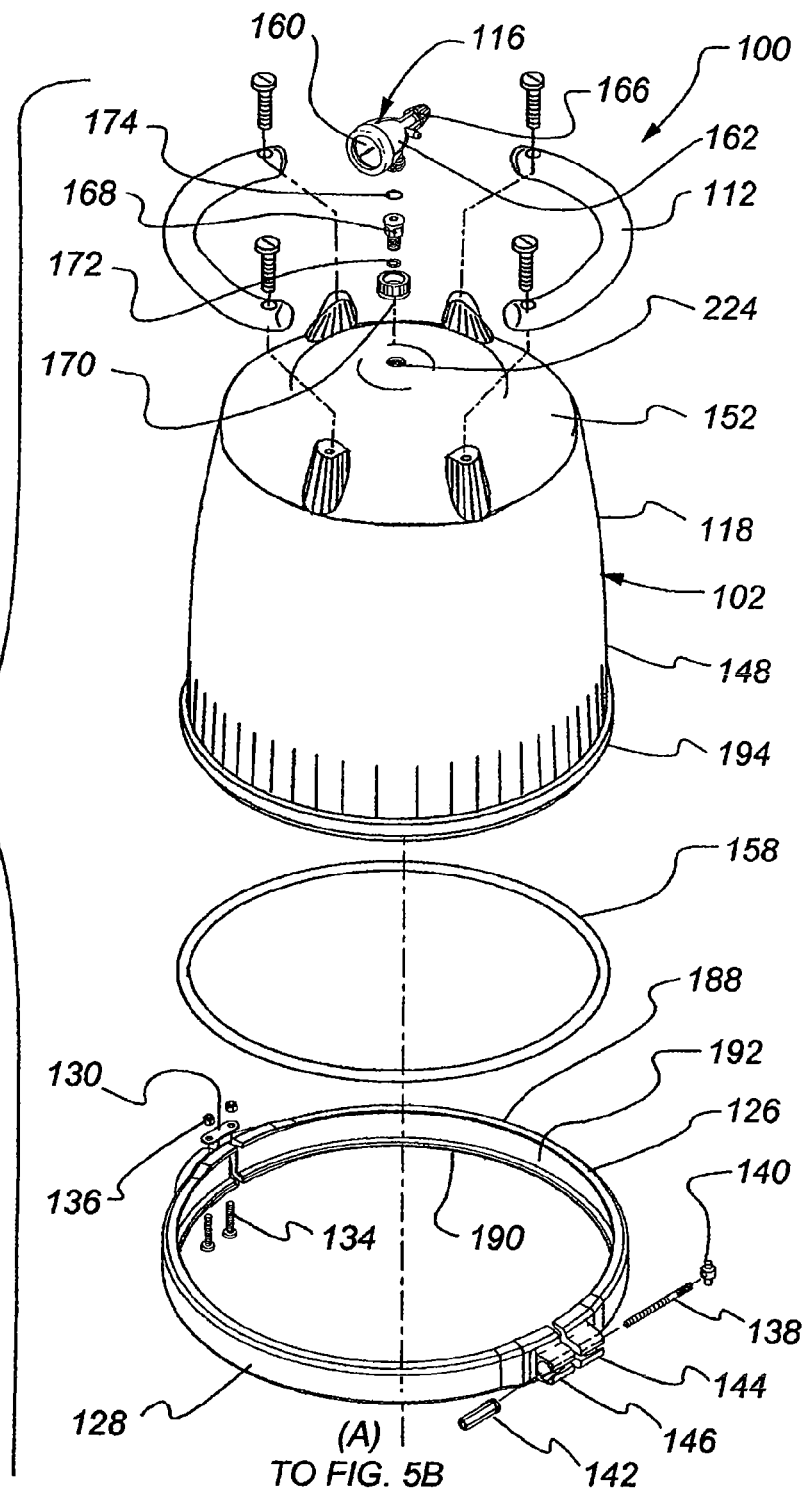
FIG. 5A is an exploded perspective view of an upper portion of the pool filter of FIG. 1.
Figure 5B:
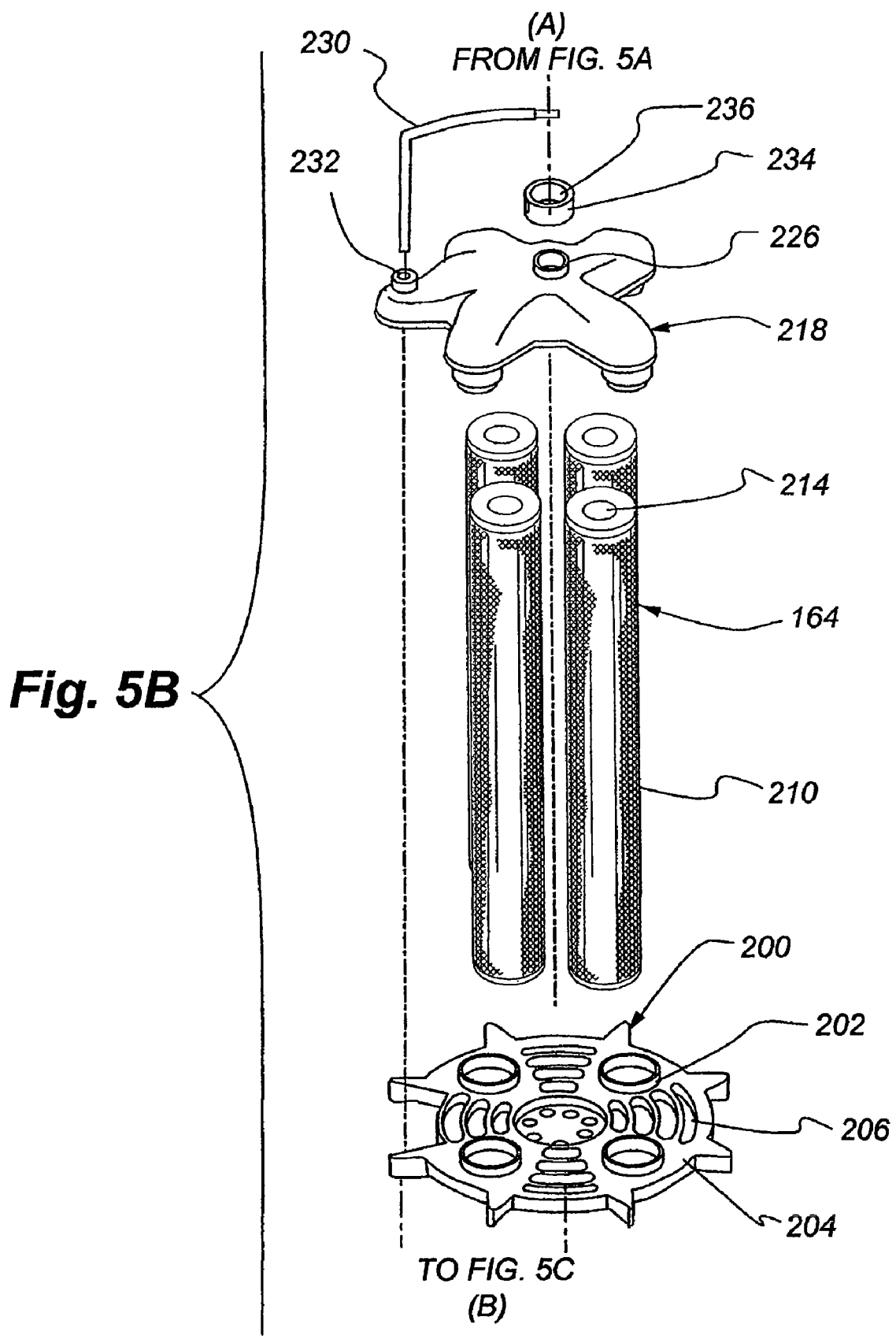
FIG. 5B is an exploded perspective view of a middle portion of the pool filter of FIG. 1.
Figure 6:
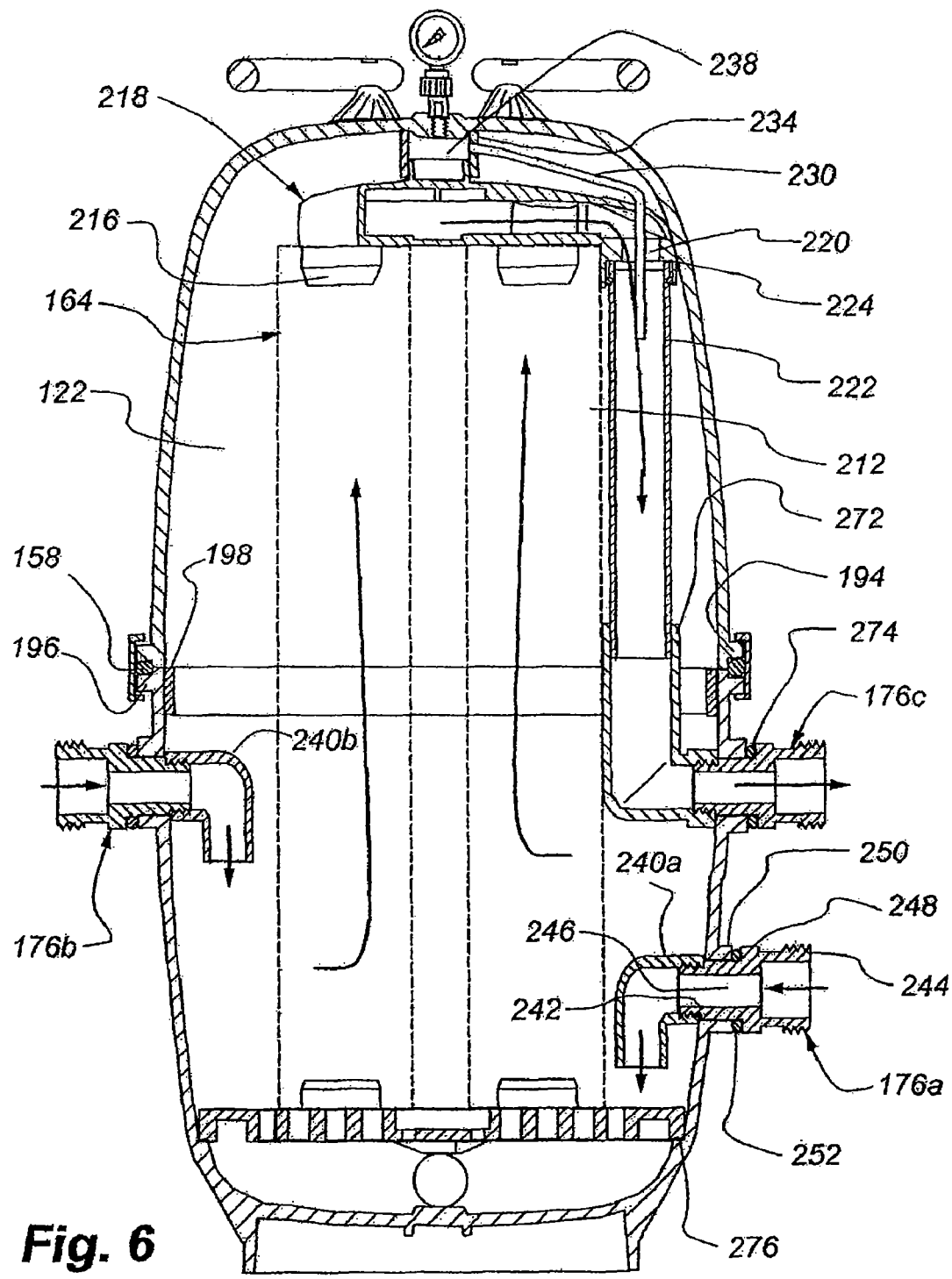
FIG. 6 is a cross-section view of the pool filter of FIG. 1, viewed along line 6-6 in FIG. 3.
Figure 11:
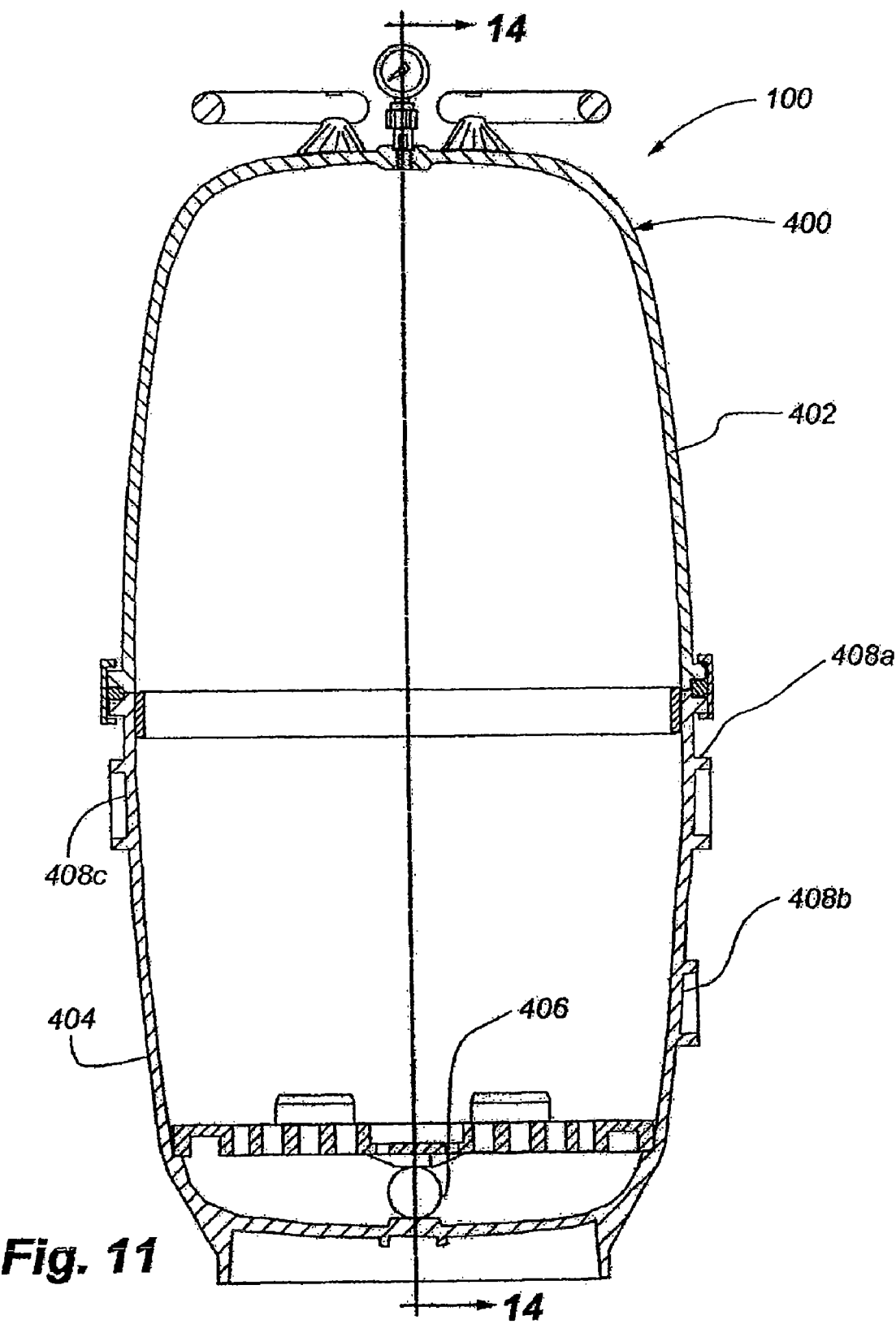
FIG. 11 is a cross-section view of another housing for the pool filter of FIG. 1, showing a view similar to the view shown in FIG. 6.

FIG. 11 depicts a cross-section view of a second embodiment of a housing 400 for the pool filter 100, similar to the cross-section view shown in FIG. 6, with various internal and external components for the pool filter, such as the filter, internal piping, manifold, fittings and so on omitted for clarity. The second housing 400 may be generally similar to the first housing 102 shown in FIGS. 1-6. Like the first housing 102, the second housing 400 may include, among other similar features, upper and lower housing portions 402, 404 and an opening 406 for a drain. However, the second housing 400 may be produced without any inlet or outlet openings. Instead, bosses 408a-c or other structures for identifying locations for one or more inlet or outlet openings may be defined in or on the housing 400. For example, the second housing 400 includes three bosses 408a-c with two bosses 408a, b generally aligned vertically on one side of the housing 400 and one boss 408c positioned approximately diametrically opposite the upper boss 408a on the other side of the housing 400. Like the inlets and outlets for the first housing 102, however, the bosses 408a-c may be positioned in other radial sectors of the housing 400. Further, the bosses 408a-c may or may not be aligned, either diametrically or vertically, on the housing 400. Yet further, more or less than three bosses, including no bosses, may be defined in or on the housing 400.

An opening 410 may be selectively drilled or otherwise formed in each boss 408a-c to define an inlet or outlet in the housing 400. As shown, for example, in FIGS. 11-13, in some embodiments, at least a portion of the opening 410 may be defined in one or more of the bosses 408a-c during manufacture of the housing 400. In such embodiments, less material is required to be removed from such bosses 408a-c to form the inlet or outlet compared to similarly sized bosses with no portion of the opening 410 formed during manufacture. However, in other embodiments, no portion of an opening 410 may be formed in a boss 408a-c during manufacture of the housing 400. Further, although the portions of the openings 410 defined in the bosses 408a-c during manufacture of the housing 400 are shown as extending from the exterior surface of the housing 400 towards the interior surface, these portions could extend from the interior surface to towards the exterior surface of the housing 400.

Figure 12:
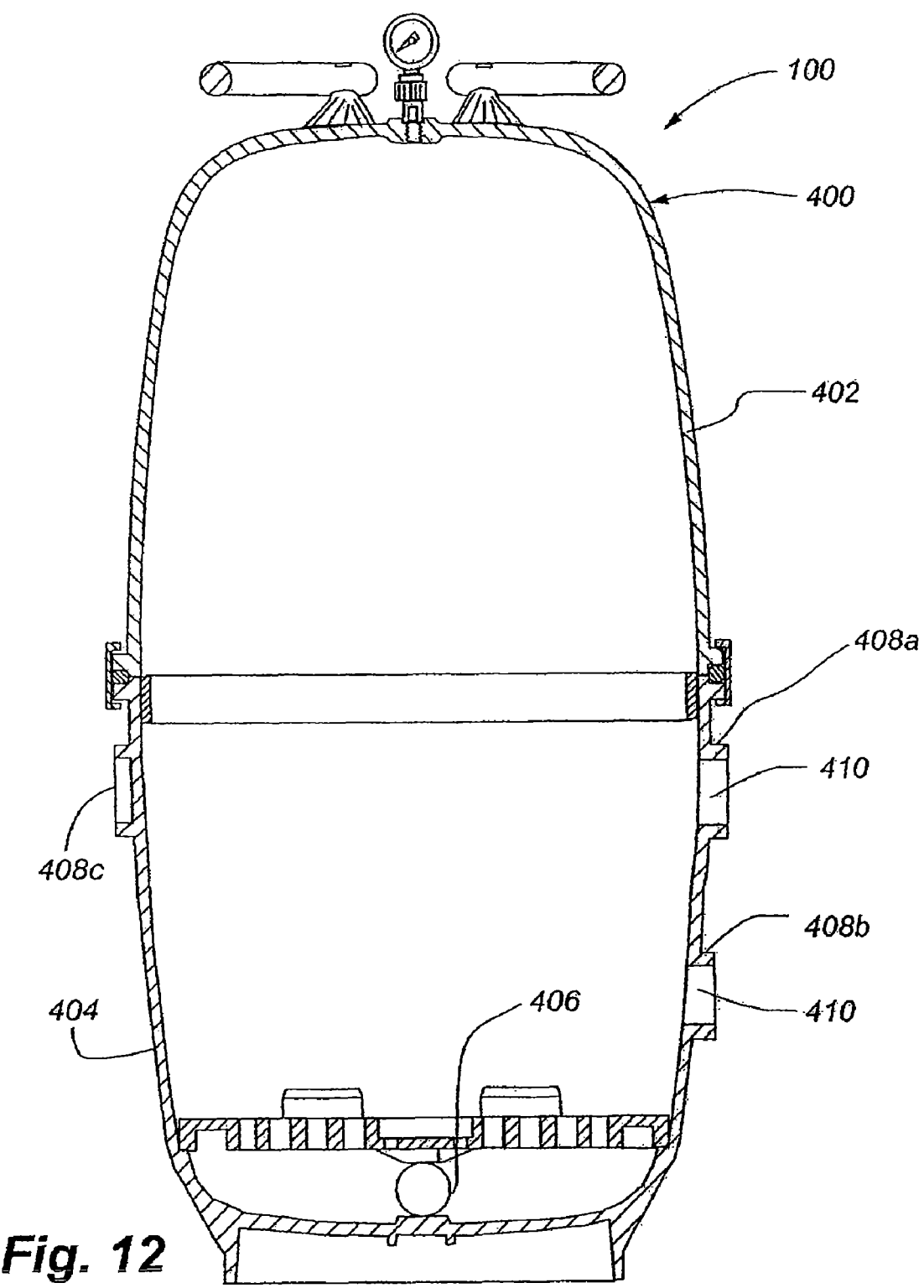
FIG. 12 is a cross-section view of the housing shown in FIG. 11, with openings formed in the bosses on the same side of the housing.
Figure 13:
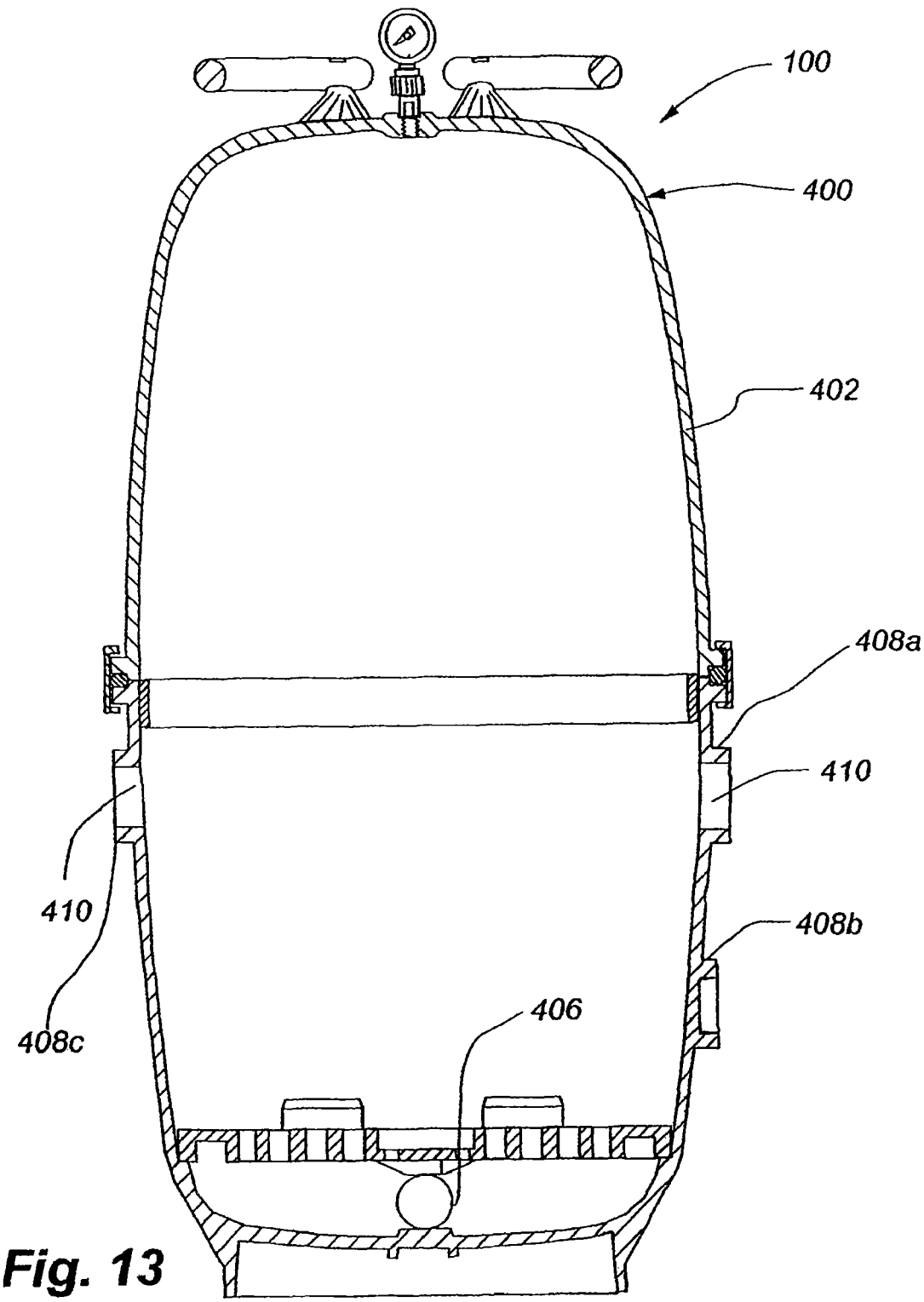
FIG. 13 is a cross-section view of the housing shown in FIG. 11, with openings formed in the bosses on opposite sides of the housing.
Figure 14:
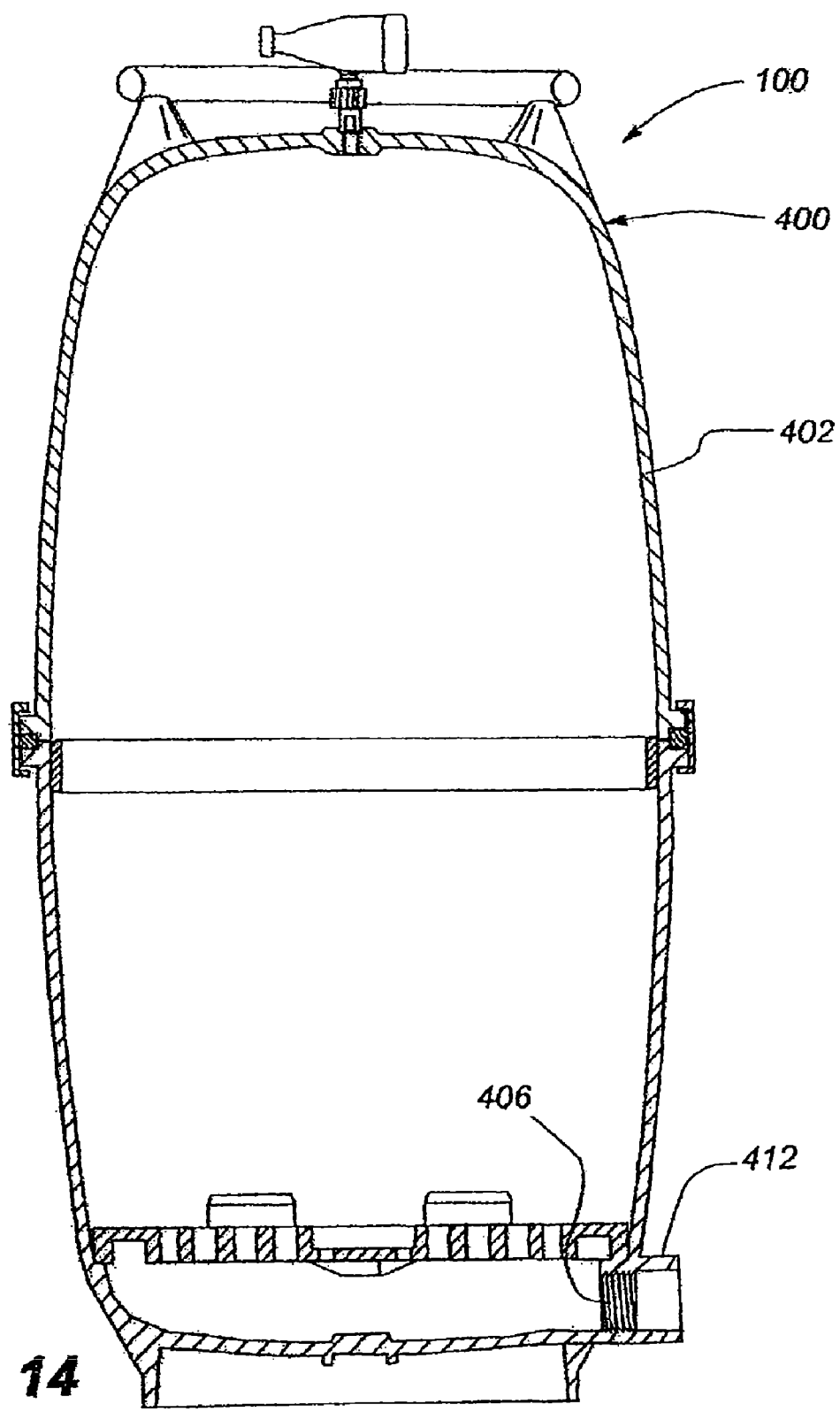
FIG. 14 is a cross-section view of the housing shown in FIG. 11, viewed along line 14-14 in FIG. 11.

Openings 410 may be formed or otherwise completed in at least two bosses to provide a fluid inlet and a fluid outlet in the housing 400 for the pool filter 100. For the bosses 408a-c shown in FIG. 11, openings 410 may be formed in the two bosses 408a, b on the same side of the housing 400 (i.e., the vertically aligned bosses) as shown, for example, in FIG. 12, or in bosses 408a, c on opposite sides of the housing 400 as shown, for example, in FIG. 13. In the first scenario, forming openings 410 in bosses 408a, b on the same side of the housing as shown in FIG. 12 would allow for inlet and outlet pipes joined to the pool filter 100 to be positioned on the same side of the housing 400. In the second scenario, forming openings 410 in bosses 408a, c located on diametrically opposite sides of the housing 400 as shown in FIG. 13 would allow for the inlet and outlet pipes joined to the pool filter 100 to be positioned on opposite sides of the housing 400. Additionally, for the second scenario, if the bosses 408a, c selected to have openings 410 formed in them were at approximately the same elevation, the inlet and outlet pipes may also be positioned on diametrically opposite sides of the housing 400 at approximately the same elevation.

Providing bosses 408a, c or other structures that require openings 410 to be formed in them to define inlets and/or outlets allows for inlets and outlets to be formed in the housing 400 based on the piping layout of the pool fluid system for the pool filter. Further, by forming openings 410 only in the bosses 408a-c that will be attached to inlet or outlet pipes, bosses that do not have openings formed in them do not require caps or seals to prevent fluid leakage through them when not connected to an inlet or outlet pipe. In other words, the inlets and outlets for the pool filter 100 may be selectively formed in positions predefined by the bosses 408a-c without needing to seal any unused inlet or outlet openings. As discussed above, however, the housing 400 may not include any bosses 408a-c or other structures for identifying the locations of inlets or outlets. In such embodiments, inlet or outlet openings may be formed at any location on the housing 400. Further, for embodiments of the housing 400 that include bosses 408a-c, inlet or outlet openings may also be formed in the housing 400 at locations other than the bosses, if desired.

Each boss 408a-c may be sufficiently sized for the particular fluid inlet or outlet piping joined to the boss 408a-c. More particularly, each boss 408a-c may be sized to be at least the minimum size for the required size of a fluid inlet or outlet. In some embodiments, a boss 408a-c may be sized larger than the minimum required size for a fluid inlet or outlet. Each boss 408a-c may be generally circular or any other suitable shape, including, but not limited to, rectangular, hexagonal, elliptical and so on. For example, if an inlet or outlet pipe has a circular cross-section with a diameter of 3 inches, the boss 408 may be circular with a diameter of no less than 3 inches, or the boss 408 may be circular with a diameter of 3½ inches or larger. The foregoing example is merely illustrative and is not intended to imply or require any particular shape or size for an inlet or outlet pipe or a boss.

Each boss 408a-c may be approximately the same size so that inlets and outlets of approximately the same size may be defined or otherwise formed in the housing 400. Yet further, each boss 408a-c may be sized so that inlets or outlets may be formed in the boss 408a-c that are the same size, or approximately the same size, as the drain outlet 406. As discussed above for the first housing embodiment, inlets and outlets of the same size may permit fittings of the same size to be used with these inlets and outlets, thus providing flexibility when joining other piping components to the second housing 400.

For the second housing 400, the drain hole or opening 406 may also be formed in a boss 412. The drain boss 412 may be similar in shape and size to the bosses 408a-c for the inlets and outlets, as described in more detail above. In some embodiments, the opening 406 for the drain may be defined in the mold that forms the boss 412. In other words, unlike the other bosses 408a-c, the boss 412 for the drain may be formed during the manufacture of the housing 400 with a opening 406 therein for the drain. However, in some embodiments, the opening 406 may be formed in the drain boss 412 after production of the housing 400 in a manner similar to the method used for defining openings 410 in the bosses 408a-c for the inlets and outlets of the housing 400.

The drain boss 412 may be similar in size to the bosses 408a-c for the inlets and the outlets. Yet further, like the first housing 102, the opening 406 formed or defined in the drain boss 412 may be the same, or substantially similar, in size as at least one of the openings 410 formed in the bosses 408a-c for the inlets and/or outlets. As discussed in more detail above, making the openings 406, 410 for the drain, the inlets and outlets a similar size provides flexibility for joining piping components, such as inlet, outlet and drain pipes, to the second housing 400. Similarly, making the bosses 408a-c, 412 for the drain, the inlets, and the outlets a similar size also enhances the ability to use similar sized fittings and other piping components with the second housing 400.

One or more footings 114 may be joined to the lower housing portion 120 to support and/or anchor the pool filter 100 on or to a support surface. Although four footings 114 are shown in the embodiment depicted in FIGS. 1-4, other embodiments may have more or less footings 114. Each footing 114 may include a main body portion 178, which may take the form of a generally L-shaped angle formed by an upright leg 180 and a base leg 182 joined at first ends. Each upright leg 180 may abut the lower housing portion 120, and each base leg 182 may abut a support surface. The lower housing portion 120 may be joined to each upright leg 180 as described in more detail below. Each base leg 182 may bear upon the support surface. One or more anchor members 184, such as anchor bolts, may anchor each base leg 182 to a support surface through holes formed in the base leg 182.

Each footing 114 may include one or more gussets or gusset portions 186 to stiffen the main body portion 178. Such stiffening may limit the possibility of the footings 114 undesirably or prematurely failing from forces, such as tension or compression forces, formed in the footings 114. For example, compression forces formed in the footings 114 may cause buckling of the footings 114 prior one or more legs 180, 182 of the footings 114 reaching their compression capacity in the absence of one or more of the gusset portions 186. Tension or compression forces formed in the footings 114 may arise from lateral or other loads imposed on the pool filter 100 by gravity, wind, or seismic activity.

In the embodiment depicted in FIGS. 1-4, each footing 114 includes two gusset portions 186 with each gusset portion 186 joined to both the upright and base legs 180, 182 on either the left or right side of the legs 180, 182. If desired, gusset portions 186 may be joined to just one of legs 180, 182. In some embodiments, each footing 114 may include more or less than two gusset portions 186. In yet other embodiments, the gussets or gusset portions 186 may be omitted. For example, the main body portion 178 may be sized or configured such that stiffeners, such as gussets, are not required or necessary for the footings 114 to resist the forces likely to be formed within them.

The footings 114 may be used to prevent the housing 102 from overturning, or from being temporarily or permanently moved to another position relative to a support surface, during an earthquake, hurricane, or other event imposing lateral and other forces upon the housing 102. The footings 114 may be designed to resist such forces, which may overturn or undesirably move the housing 102, up to at least a minimal predetermined force level. For example, the footings may be designed to resist likely forces imposed on the pool filter 100 by a class 3 hurricane or a zone IV seismic event.

FIGS. 5A-5C depict exploded perspective views of upper, middle and lower portions of the pool filter 100. With reference to FIGS. 5A-5C and 6, the upper housing portion 118 may be separated from the lower housing portion 120 to access the fluid chamber 122 for cleaning or replacing the filter 164, or to otherwise perform maintenance within the fluid chamber 122 of the pool filter 100. To separate the two housing portions 118, 120, the clamp ring fastener assembly may be loosened to permit the first and second clamp ring bands 126, 128 to be disengaged from the upper and lower housing portions 118, 120. Once the clamp ring bands 126, 128 are sufficiently disengaged, the upper housing portion 118 may be lifted off, or otherwise moved away from, the lower housing portion 120. The handles 112 or other gripping elements may be grasped to lift the upper housing portion 118 off the lower housing portion 120.

Each clamp ring band 126, 128 may generally include upper and lower clamp ring band flanges 188, 190 joined by a clamp ring band web 192. Together, the clamp ring band flanges 188, 190 and web 192 may define a generally C-shaped cross-sectional area along the axial length of each clamp band 126, 128. The upper housing portion 118 may include an annular flange 194 formed proximate its lower opening for receipt between the clamp ring band flanges 188, 190. Similarly, the lower housing portion 120 may include an annular flange 196 formed proximate its upper opening for receipt between the clamp ring band flanges 188, 190. The clamp ring band flanges 188, 190 may engage these upper and lower housing flanges 194, 196 when the clamp ring bands 126, 128 are joined to the upper and lower housing portions 118, 120 to limit or otherwise prevent separation of the upper housing portion 118 from the lower housing portion 120, especially separation resulting from the pressure formed within the pool filter fluid chamber 122 during operation. The flanges 194, 196 in the upper and lower housing portions 118, 120 may define an annular groove for receiving a housing O-ring 158 or other suitable sealing element to limit or prevent fluid leakage between the joint formed by the upper and lower housing portions 118, 120.

With reference to FIGS. 5C and 6, a retaining band 198 may be received within the lower housing portion 120. The retaining band 198 may be positioned proximate the upper opening of the lower housing portion 120. An inner diameter of the lower housing portion 120 may decrease proximate a lower end of the retaining band 198 when moving away from the upper opening to maintain the retaining band's position within the lower housing portion 118. The retaining band 198 may oppose inward forces exerted on the upper and lower housing portions 118, 120 by the clamp ring bands 126, 128. The retaining band may be composed of metal, plastic, or any other suitable material.

Turning to FIGS. 5B and 6, the fluid chamber 122 may contain one or more filters 164 for filtering fluid received within the fluid chamber 122 from a fluid inlet. Each filter 164 may be supported at a lower end by a filter support 200. The filter support 200 may include a filter support column 202 for each filter. Each filter support column 202 may extend upward from a filter support base 204 and may be configured to mate with a lower portion of a filter 164. The filter support base 204 may include a plurality of slots or openings 206 defined within the filter support base 204 for reducing the weight of the filter support 200. The slots 206 or openings may also aid in forming the filter support 200 from a plastic or other material that is heated or liquefied in order to form the desired shape by helping to minimize or reduce uneven cooling of such material.

Each filter 164 may include a screen or mesh 210 formed into a cylinder, or other desired shape. The screen or mesh 210 may extend from an upper to a lower portion of the filter 164. Fluid, such as water, may flow through the mesh into a fluid passage 212 defined by the mesh 210. Particles and other debris larger than the mesh openings are separated from the fluid as the fluid flows through mesh 210, thus filtering the fluid. An upper end portion of the filter 164 may include a fluid outlet 214. The fluid outlet 214 may be fluidly connected to the filter fluid passage 212. Each filter fluid outlet 214 may also be fluidly connected to a fluid inlet 216 of a filter manifold 218.

The filter manifold 218 may receive fluid from each manifold inlet 216 for conveyance to a manifold fluid outlet 220. The manifold fluid outlet 220 may, in turn, be fluidly connected to an outlet tube 222. Thus, fluid flows through the filter 164 to the filter manifold 218 and then from the filter manifold 218 to the outlet tube 222. An outlet pipe O-ring 224 or other sealing element may be positioned between the filter manifold 218 and the outlet tube 222 to limit or prevent fluid leakage through the joint formed between the filter manifold 218 and the outlet tube 222. A groove 228 or other recess may be defined in the outlet tube 222 for receiving the outlet pipe O-ring 224 as shown in FIGS. 5C and 6, the filter manifold 218 (not shown), or both.

The filter manifold 218 may also include a pressure gauge opening 226. The pressure gauge opening 226 may be joined to the pressure gauge 160 via the tank adapter 168 for monitoring the pressure within the filter 164. As the fluid chamber 122 fills with debris and/or the filter becomes clogged with debris, the fluid pressure within the fluid chamber 122 increases. Pressures above a predetermined threshold may cause the upper housing portion 118 to be blown off, or otherwise separated, from the lower housing portion 120. Thus, the pressure gauge 160 may provide a way to monitor the filter pressure to assess when the filters 164 require cleaning or replacement, or the fluid chamber 122 needs to be cleaned, in order to avoid build up of pressures above the threshold amount within the pool filter 100.

With continued reference to FIGS. 5B and 6, a breather tube 230 may be received through a breather tube hole 232 formed in the filter manifold 218. The breather tube 230 may reduce air pressure within the fluid outlet pipe 222 by permitting an outlet for air to exit the outlet pipe 222. The breather tube 230 may be composed of a flexible plastic or other desired material.

A spacer 234 may be positioned between the filter manifold 218 and the upper housing portion 118 to maintain, in conjunction with the filter support 200 and the upper housing portion 118, the relative position of the filter manifold 218 and the filters 164 within the fluid chamber 122. The filter manifold 218 may include a spacer column 236 for removably joining the spacer 234 to the filter manifold 218. In particular, the spacer column 236 may be sized for receiving a spacer hole 236 formed in the spacer 234. In other embodiments, the spacer 234 may be removably or fixedly joined to the filter manifold by any suitable connection method, such as welding, adhering, and so on, or may be integrally formed with the manifold filter 218 by any suitable methods, such as injection molding, cast molding, and so on. A spacer wall 238 may extend from the upper housing portion 118 to removably join the spacer 234 to the upper housing portion 118 in a manner similar to the method described above for joining the spacer 235 to the filer manifold 218. Connecting the spacer 234 to the filter manifold 218 and the upper housing portion 118 helps to maintain the position of the spacer 234 between the filter manifold 218 and the upper housing portion 118.

Figure 3:
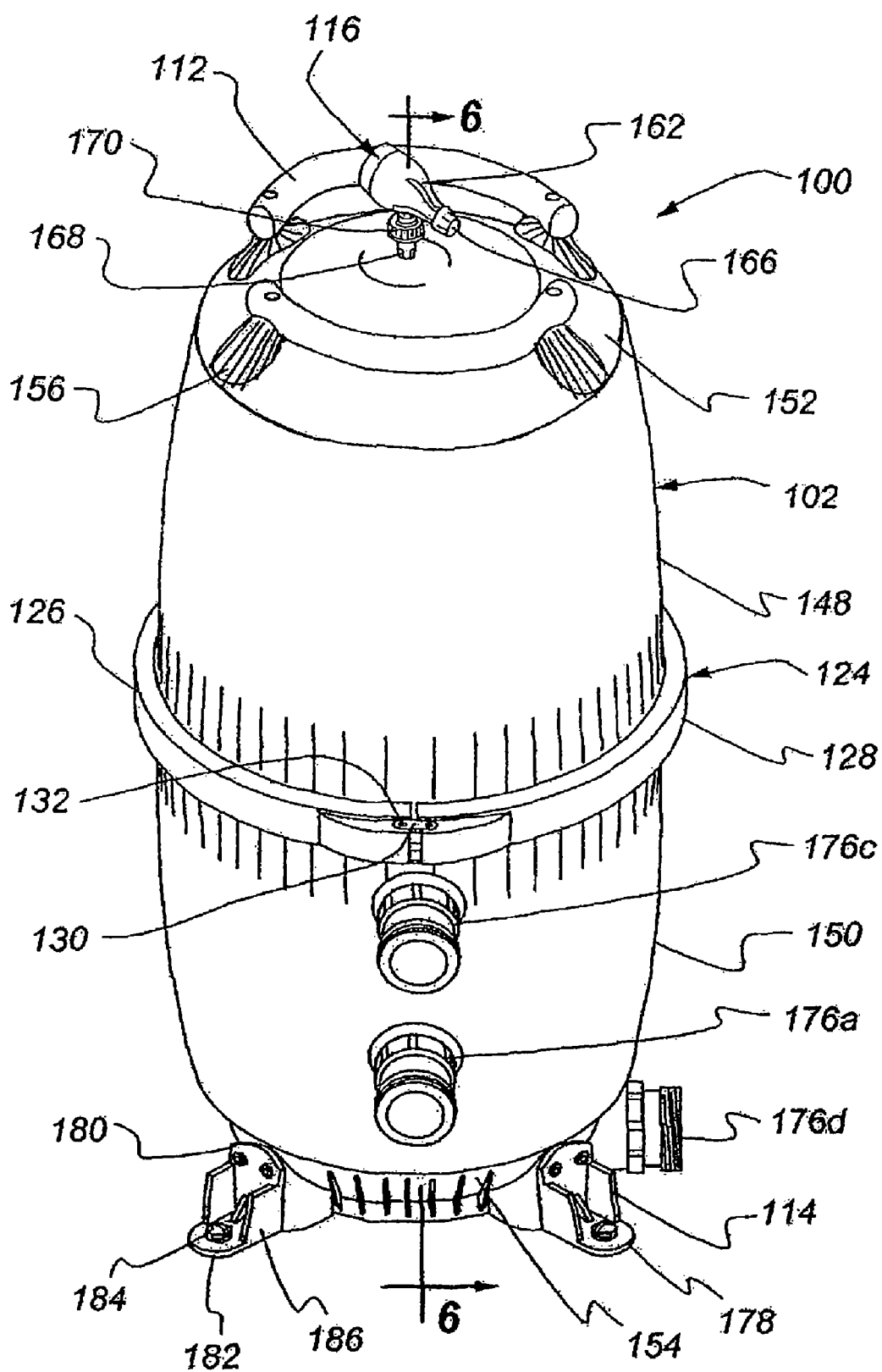
FIG. 3 is yet another perspective view of the pool filter of FIG. 1.
Figure 4:
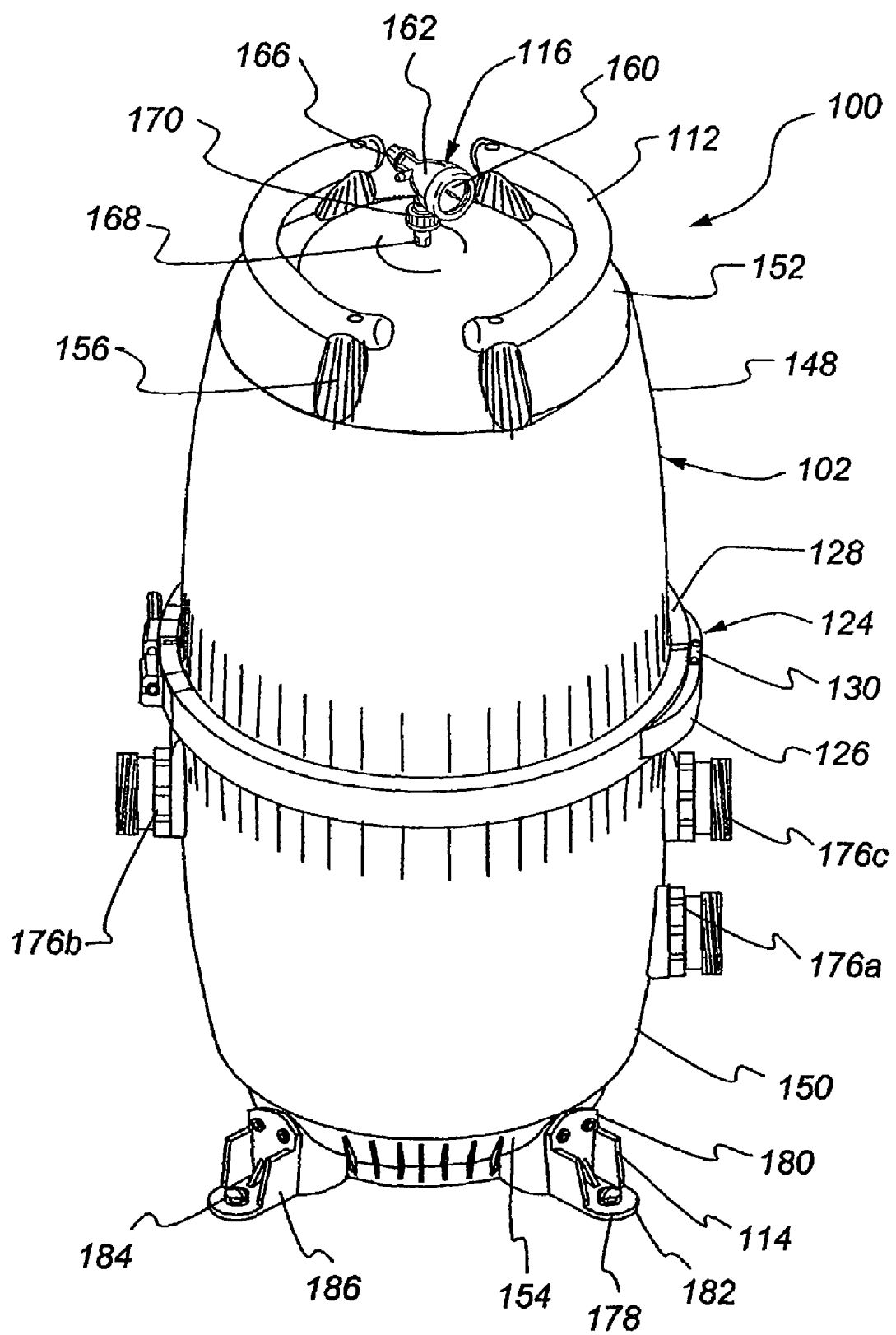
FIG. 4 is still yet another perspective view of the pool filter of FIG. 1.

FIG. 6 depicts a cross-sectional view of the pool filter 100, viewed along line 6-6 in FIG. 3. With reference to FIG. 6, a fluid diffuser 240a-b may be joined to a fitting 176a-b at each fluid inlet formed in the lower housing portion 120 to diffuse a fluid stream entering the fluid chamber 122. The fluid diffusers 240*a-b* may be elbow shaped as shown in FIG. 6 or any other suitable shape. A portion of the fluid diffusers 240*a-b* may be threaded for threadedly joining the diffusers 240*a-b* to a respective fitting 176*a-b*. Any of the diffusers and fittings may be composed of plastic, such as polyvinyl chloride (PVC), metal, or any other desired material.

An inlet fitting 176*a* may include a first threaded end 242 sized for insertion through the housing opening. The first threaded end 242 may be threaded onto threads formed on the fluid diffuser 240*a* to join the fitting 176*a* to the fluid diffuser 240*a*. The fitting 176*a* may be joined to the diffuser 240*a* by other methods for joining piping elements, such as press fitting, clamping, and so on. A second threaded end 244, distal to the first threaded end 242, may be used to thread a coupling nut or the other connector onto the fitting 176*a* for joining an inlet pipe, tube, or hose for a pool or other fluid system to the pool filter. Although the fittings 176*a-b*, the diffusers 240*a-b*, and the pool system pipes are depicted and/or described as being threadedly joined, any of these elements may be joined to other elements by other methods for joining piping elements, such as press fitting, clamping, and so on.

An inlet fitting 176*a* may include a body portion defining a fluid passage 246 extending between fluid openings defined by the body portion at the first and second ends 242, 244 of the fitting 176*a*. The body portion may define a generally cylindrical shape for the fitting 176*a* or any other desired shape. An interior surface of the body portion may step radially inward to decrease the size of the fluid passage 246 from the external side (second end 244) to the internal side (first end 242) of the fitting 176*a*. An outer surface of the body portion may extend radially outward to define a fitting flange 248 for engagement with an annular inlet wall 250 encompassing the fluid opening and extending outward from the outer surface of the lower housing portion 120. Engagement of the fitting flange 248 with the inlet wall 250 limits further insertion of the fitting 176*a* into the fluid chamber 122 of the pool filter. The inlet wall 250 may cooperate with the fitting flange 248 to define a groove for receiving an O-ring 252 or other seal element to limit or prevent fluid leakage between the joint formed between the fitting 176*a* and the lower housing portion 120.

Figure 6B:
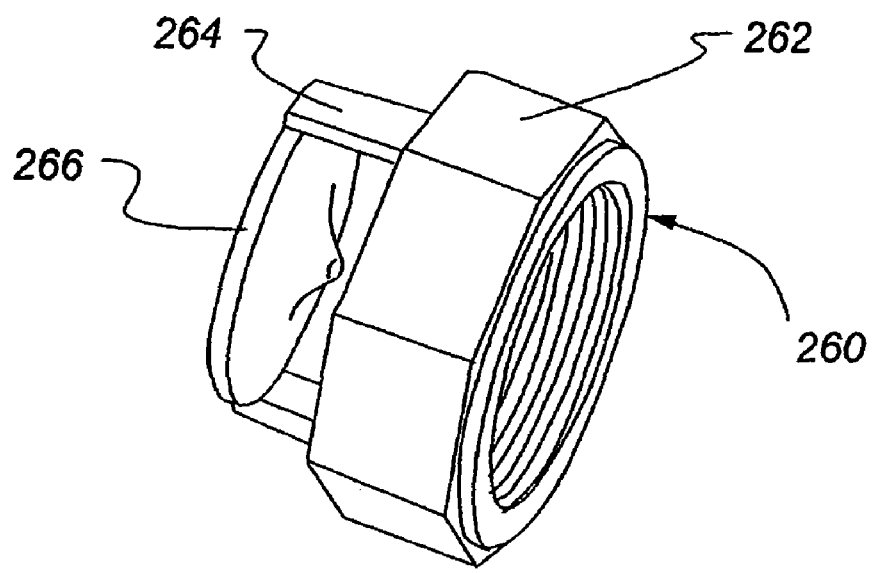
FIG. 6B is perspective view of the diffuser shown in FIG. 6A.
Figure 6A:
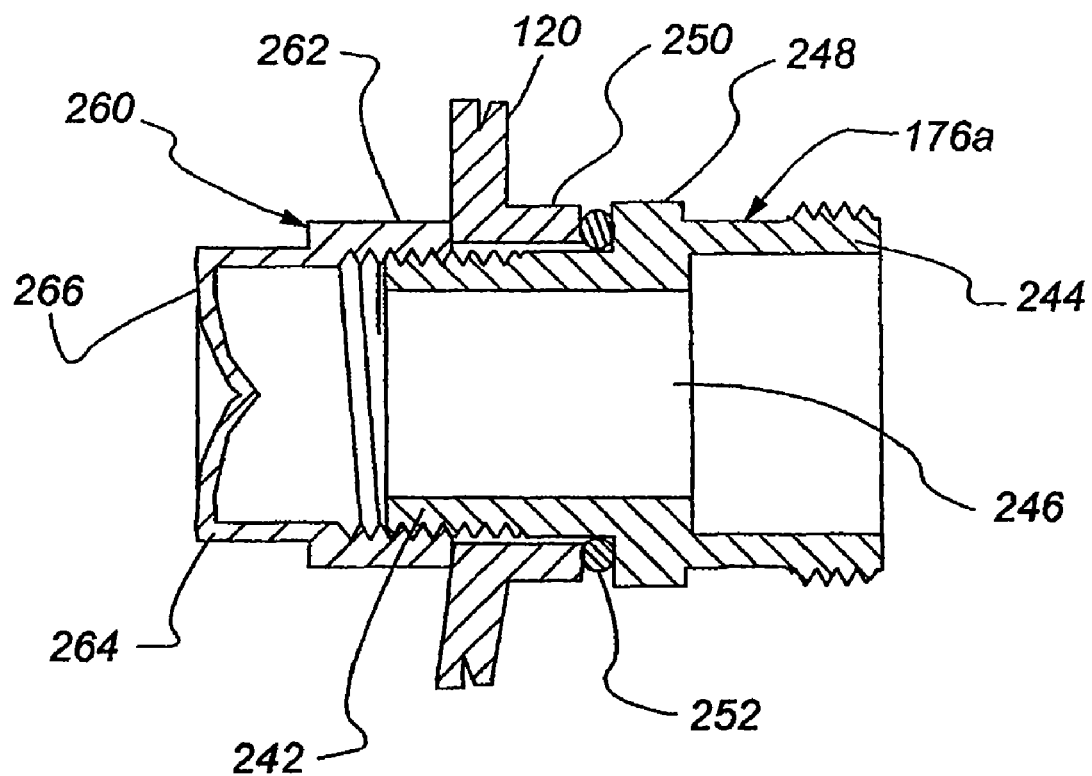
FIG. 6A is a detailed, cross-section view of a portion of the pool filter of FIG. 1, showing a second embodiment of a diffuser joined to the fitting.

FIGS. 6A and 6B depict another embodiment of a diffuser 260. The second diffuser embodiment may be joined to an inlet fitting 176*a* in a manner similar to the first embodiment. The second fluid diffuser 260 may include diffuser body portion 262 defining an internally threaded, cylindrical opening for threadedly joining the fluid diffuser 260 to the fitting 176*a*. An external surface of the diffuser body portion 262 may be polygonal shaped to provide flat engagement surfaces for a user or tool to grip when threadedly joining the fluid diffuser 260 to the fitting 176*a*. A pair of fluid diffuser posts 264 or columns may extend generally co-axially with the fluid opening axis from the diffuser body portion 262. The fluid diffuser posts 264 may be positioned on diametrically opposite sides of the diffuser body portion 262. A diffuser plate 266 may be joined at distal ends of the diffuser columns 264 to provide a separation distance between the diffuser fluid opening and the diffuser plate 266. The diffuser plate 266 may be a generally circular planar plate having a conical surface facing the diffuser fluid opening. The planar area of the diffuser plate 266 may be sized to approximately match and may be located approximately parallel to the planar area of the diffuser fluid opening.

With continued reference to FIG. 6A, fluid, such as water, entering the pool filter 100 through an inlet opening may strike the diffuser plate 266, thus dispersing the entering fluid stream into a outwardly expanding conical pattern as the fluid stream enters the fluid chamber 122. Different fluid dispersing patterns may be obtained by changing the shape of the diffuser plate surface and/or the angle of the plate surface relative to the opening.

The outlet fitting 176*c* may be similar to the inlet fittings 176*a-b* described above. In a manner similar to the inlet fittings 176*a-b*, a portion of the outlet fitting 176*c* may be inserted through the outlet opening to threadedly join the outlet fitting 176*c* to an outlet elbow 272. Also, an O-ring 274 or other fluid sealing element may be positioned between the outlet fitting 176*c* and the lower housing portion 120. Additionally, the outlet fitting 176*c* may be joined to the outlet elbow 272 by any other method for joining piping elements, such as press fitting, clamping, and so on.

The interior surface of the lower housing portion 120 may be stepped near the bottom to define a ledge 276. The ledge 276 may generally extend around the internal perimeter of the lower housing portion 120. The ledge 276 may support the filter support 200 above the lower end of the lower housing portion 120. If desired, the ledge 276 may extend around substantially the entire, or a portion of the, internal perimeter of the lower housing portion 120. The ledge 276 may be continuous, or may be formed into one or more discrete portions. Openings or slots may be defined between the ledge 276 and the filter support 200 to allow fluid to enter the space between the filter support 200 and the bottom of the lower housing portion 120 for draining fluid through the drain outlet.

One possible operation of the pool filter will be described with reference to FIGS. 1-6. Fluid may enter the fluid chamber 122 through a diffuser 204*a* fluidly connected with an inlet opening. After entering the fluid chamber 122, fluid may flow through a filter 164 and into a manifold fluid inlet 216. As described above, the filter 164 separates particles from the fluid. From the manifold fluid inlet 216, fluid may flow to the manifold fluid outlet 220 through a fluid passage defined by the manifold body. Fluid may then flow into the outlet pipe 222 connected to the fluid manifold outlet 220. The outlet elbow 272 may be joined at a lower end of the outlet pipe 222 to change the direction of fluid flow from a substantially downward direction to a substantially horizontal direction. The outlet elbow 272 may also be joined to the outlet fitting 176*c* to deliver filtered fluid from the pool filter to a pool or other fluid system pipe, tube, or hose joined to the fitting 176*c*. As required, O-rings may be placed between any of the connections between the outlet tube, the manifold, the elbow fitting, and other joints formed between joined parts containing or conveying fluid. Alternatively, or in combination with sealing elements, any of the components may be heat or sonically welded, or otherwise permanently joined, to form a liquid-tight seal between these elements, especially at locations where they are joined together.

Figure 7:
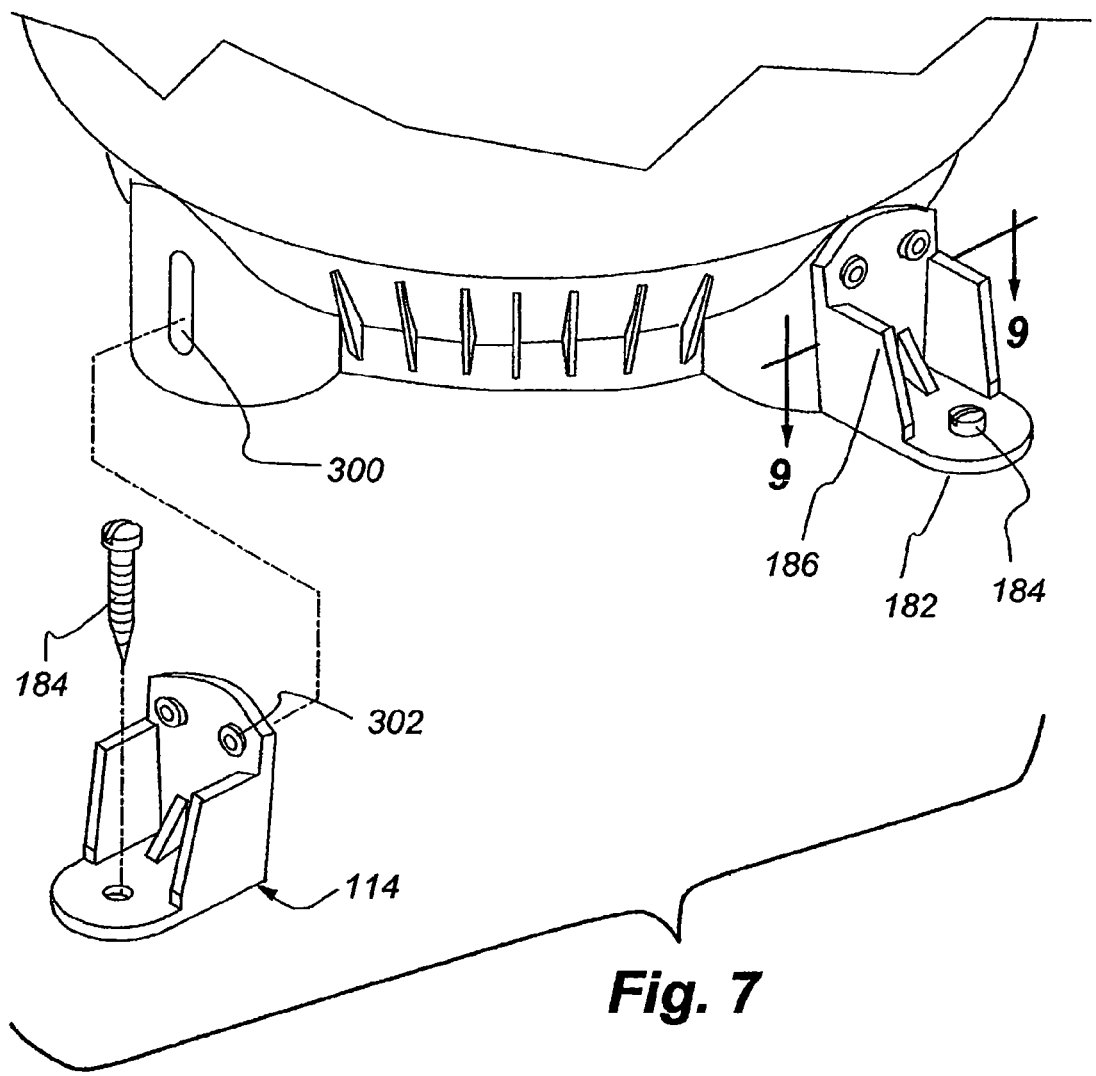
FIG. 7 is a partially exploded perspective view of a lower portion of the pool filter of FIG. 1.
Figure 8:
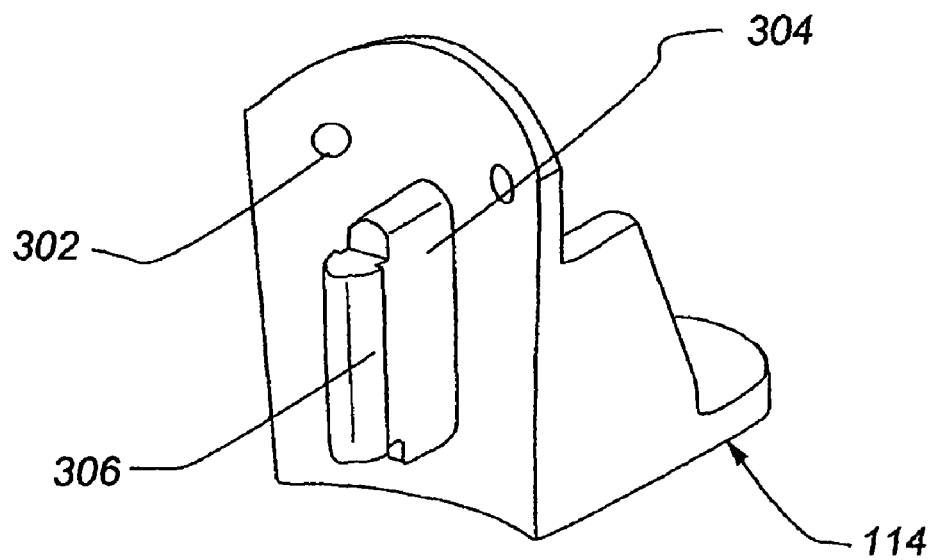
FIG. 8 is a perspective view of a footing for the pool filter of FIG. 1.
Figure 9:
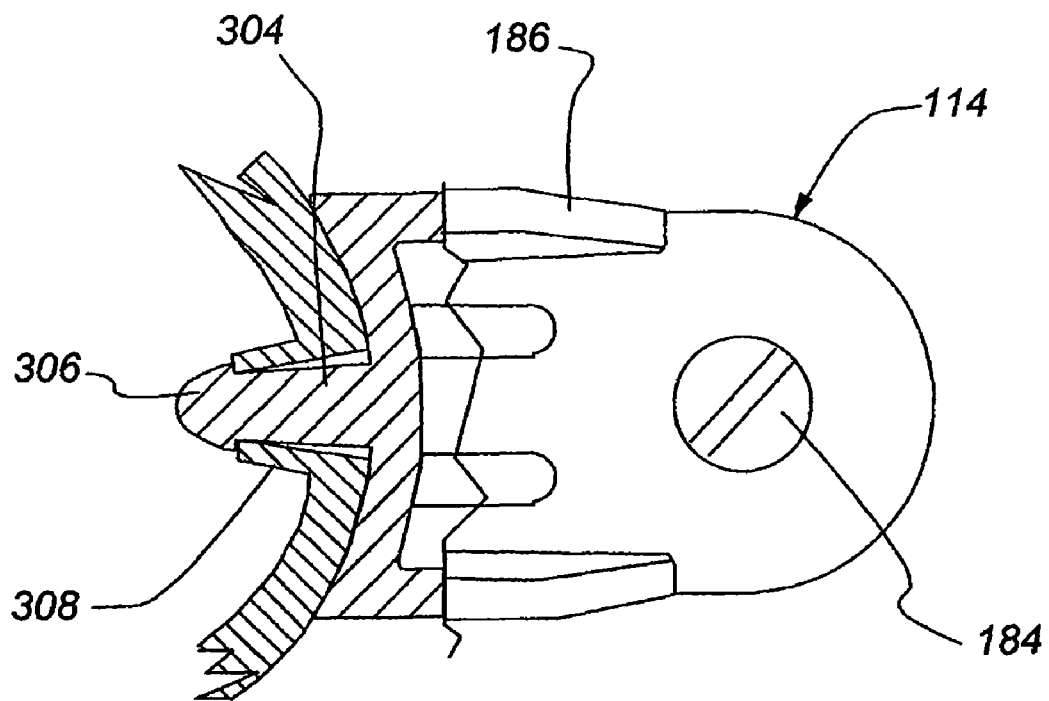
FIG. 9 is a partial cross-sectional view of the pool filter of FIG. 1, viewed along line 9-9 of FIG. 7.

FIGS. 7-9 depict the footings 114 and their connection to the housing 102 in more detail. With reference to FIG. 7, the lower housing portion 120 may include slots 300 for joining each footing 114 to the housing 102. The slots 300 may be generally oval or any other desired shape. Each footing may include one or more upper holes 302 for receiving fasteners (not shown) to join the footing 114 to the housing 102. The fasteners may be self-tapping screws, or holes (not shown) may be pre-drilled or formed in the housing 102 for receiving the fasteners.

Turning to FIGS. 8 and 9, a footing wall 304 may extend rearward from a footing 114. The footing wall 304 may end in a head 306 for engagement with wings 308 extending from the housing 102. The head 306 may be arrowhead shaped or any other suitable shape for engagement with the wings 308.

The wings 308 may be sufficiently flexible to move away from each other as the prong 304 is inserted through the housing slot 300. Once the head 306 clears the inner edge of the wings 308, the wings 308 move inward such that a bearing surfaces of the head 306 engage the inward edges of the wings 308. Such engagement between the head 306 and the wings 308 resists removal of the footing wall 304 from the housing slot 300.

In some embodiments, the footing wall 304 may take the form of a pair of prongs that extend rearwardly from a footing 114. Each prong may end in a tab for engagement with the housing 102. The prongs may be biased slightly outward from each other to engage an inner edge of the housing 102 when inserted through the housing slots 300. The prongs may be sufficiently flexible to move towards each other as they are inserted through the housing slot 300. Once the tabs on the prongs clear the inner surface of the inner edge of the housing slot 300, the bias in the prongs moves them outward such that the tabs engage the inner edge of the housing 102 proximate the slot 300. Such engagement resists removal of the footing 114 from the housing 102.

In yet other embodiments, the footings 114 may be joined to the housing 102 using heat or sonic welding, adhesives, other joining methods, or some combination of methods. Regardless of the method, or the combination of methods, used to join the footings 114 to the housing 102, the connection between the footings 114 and the housing 102 may be designed to at least transfer minimum predetermined forces that may be imposed upon the pool filter 100 to a support surface through the footings 114 to limit or prevent overturning or other undesired movement of the housing 102 from its rest position.

Figure 10:
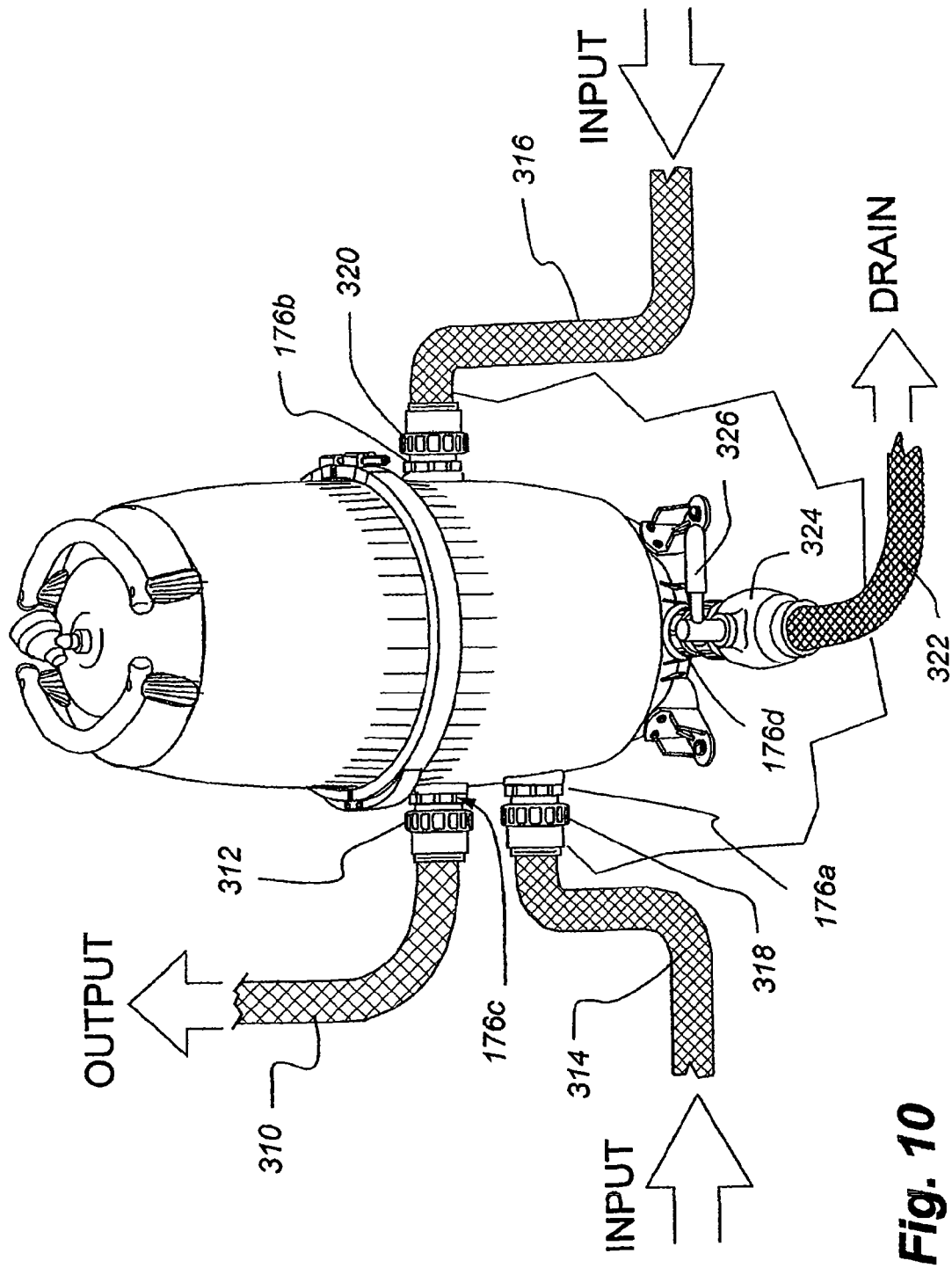
FIG. 10 is a perspective view of the pool filter of FIG. 1 showing various fluid piping components joined to the pool filter.

FIG. 10 depicts a perspective view of the pool filter 100 showing how various piping members of the pool system may be connected to the pool filter 100. With reference to FIG. 10, a pool outlet member 310, such as a pipe, hose or tube, may be joined to the outlet fitting 176c using a coupling nut 312 to fluidly connect the pool outlet member 310 to the fluid outlet opening in the pool filter 100. Similarly, pool inlet members 314, 316 may be joined to first and second inlet fittings 176a, b using coupling nuts 318, 320 to fluidly connect these members to the fluid inlet openings in the pool filter 100. In a like manner, a pool filter drain member 322, such as a pipe, hose or tube, may be joined to a drain fitting 176d, which may be similar to the inlet and outlet fittings described above, using a coupling nut 324 to fluidly connect the drain member 322 to the drain opening in the pool filter 100. The drain coupling nut 324 may further include a valve lever 326 to selectively open and close a valve associated with the drain member 322.

The components of the pool filter described herein, including the housing, the clamp ring assembly, the footings, the O-rings, the filters, and so on, may be composed of any suitable material, including, but not limited to, plastic (e.g., PVC), metal, alloy, rubber, and so on. Any of the components may be formed from a single part, or may be formed from multiple parts joined together to create the component. Although various components of the filter, such as the footings, filter, fittings and so on, have been shown and described primarily in connection with the first embodiment of the housing, any of these components may be used with the second embodiment of the housing shown in FIGS. 11-14 or with any other suitable pool filter housing.

All directional references (e.g., upper, lower, upward, downward, left, right, leftward, rightward, top, bottom, above, below, inner, outer, vertical, horizontal, clockwise, and counterclockwise) are only used for identification purposes to aid the reader's understanding of the example of the invention, and do not create limitations, particularly as to the position, orientation, or use of the invention unless specifically set forth in the claims. Joinder references (e.g., attached, coupled, connected, joined, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A pool filter for connection between two components of a pool piping system, a first component having an inlet and a second component having an outlet, said pool filter comprising:
    a housing defining a chamber for receiving a filter; and
    at least one filter cartridge received within the chamber;
    the housing including at least three bosses with each of the three bosses sufficiently sized for forming either a fluid inlet or a fluid outlet therein;
    wherein at least one of the at least three bosses is an inlet boss, said inlet boss is located adjacent to the second component;
    wherein at least one of the at least three bosses is an outlet boss, said outlet boss is located adjacent to the first component; and
    wherein at least one inlet boss and at least one outlet boss are positioned on a similar side of the housing.

2. The pool filter of claim 1, wherein the housing includes an upper end portion and a lower end portion, and an outlet is positioned within the lower end portion of the housing.

3. The pool filter of claim 1, wherein at least two of the at least three bosses includes an opening.

4. The pool filter of claim 3, wherein the opening for one of the at least two bosses defines a fluid inlet.

5. The pool filter of claim 3, wherein the opening for one of the at least two bosses defines a fluid outlet.

6. The pool filter of claim 5, wherein the opening for another of the at least two bosses defines a fluid inlet.

7. The pool filter of claim 6, wherein the fluid inlet and the fluid outlet are positioned on the same side of the housing.

8. The pool filter of claim 6, wherein the fluid inlet and the fluid outlet are positioned on opposites sides of the housing.

9. The pool filter of claim 1, further comprising a drain boss including a first opening.

10. The pool filter of claim 9, wherein at least one of the at least three bosses includes a second opening, and a size of the first opening for the drain boss is substantially equal to a size for the second opening of the at least one of the at least three bosses.

11. The pool filter of claim 1, wherein at least two of the three bosses are positioned at a similar elevation on the housing.

12. A pool filter for connection between two components of a pool piping system, a first component having an inlet and a second component having an outlet, said pool filter comprising:
   a housing defining a chamber for receiving a filter; and
   at least one filter cartridge received within the chamber;
   the housing including at least three bosses with each of the three bosses sufficiently sized for forming either a fluid inlet or a fluid outlet therein;
   wherein at least one of the at least three bosses is an inlet boss, said inlet boss is located adjacent to the second component;
   wherein at least one of the at least three bosses is an outlet boss, said outlet boss is located adjacent to the first component; and
   wherein at least two of the three bosses are positioned at a similar elevation on the housing and the elevation of the bosses is at least as high as the highest elevation of the bosses positioned approximately on a same side of the housing.

13. The pool filter of claim 12, wherein the housing includes an upper end portion and a lower end portion, and an outlet is positioned within the lower end portion of the housing.

14. The pool filter of claim 12, wherein at least two of the at least three bosses includes an opening.

15. The pool filter of claim 14, wherein the opening for one of the at least two bosses defines a fluid inlet.

16. The pool filter of claim 14, wherein the opening for one of the at least two bosses defines a fluid outlet.

17. The pool filter of claim 16, wherein the opening for another of the at least two bosses defines a fluid inlet.

18. The pool filter of claim 17, wherein the fluid inlet and the fluid outlet are positioned on the same side of the housing.

19. The pool filter of claim 17, wherein the fluid inlet and the fluid outlet are positioned on opposites sides of the housing.

20. The pool filter of claim 12, further comprising a drain boss including a first opening.

21. A pool filter for connection between two components of a pool piping system, a first component having an inlet and a second component having an outlet, said pool filter comprising:
   a housing defining a chamber for receiving a filter;
   at least one filter cartridge received within the chamber; and
   at least one footing joined to the housing and configured to receive an anchoring member to anchor the housing to a support surface;
   the housing including at least three bosses with each of the three bosses sufficiently sized for forming either a fluid inlet or a fluid outlet therein;
   wherein at least one of the at least three bosses is an inlet boss, said inlet boss is located adjacent to the second component;
   wherein at least one of the at least three bosses is an outlet boss, said outlet boss is located adjacent to the first component, and
   wherein the housing includes at least one slot, and the at least one footing includes at least one tab sized for receipt within the slot.

22. The pool filter of claim 21, wherein the at least one footing includes a pair of legs configured to form an angle.

23. The pool filter of claim 22, wherein at least one of the pair of legs abuts the housing.

24. The pool filter of claim 22, wherein at least one of the pair of legs abuts the support surface.

25. The pool filter of claim 22, wherein at least one of the pair of legs defines a hole for receiving the anchoring member.

26. The pool filter of claim 21, wherein the anchoring member comprises an anchor bolt.

27. The pool filter of claim 21, wherein the at least one tab engages the housing to resist removal of the at least one footing from the housing.

28. The pool filter of claim 21, wherein the at least one footing includes a member extending from the at least one footing and at least one of the at least one tab is positioned at a distal end of the member.

29. The pool filter of claim 21, wherein the at least one footing comprises at least one leg and at least one gusset connected to the at least one leg.

* * * * *